United States Patent
Aida et al.

(10) Patent No.: US 12,384,147 B2
(45) Date of Patent: Aug. 12, 2025

(54) POWER SUPPLY CONTROL APPARATUS, METHOD AND RECORDING APPARATUS

(71) Applicant: CANON KABUSHIKI KAISHA, Tokyo (JP)

(72) Inventors: Takahiro Aida, Tokyo (JP); Yosuke Ezumi, Ibaraki (JP); Takuhiro Ogushi, Kanagawa (JP); Yukinori Nishikawa, Kanagawa (JP); Hideyuki Ueki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 18/368,631

(22) Filed: Sep. 15, 2023

(65) Prior Publication Data
US 2024/0100826 A1    Mar. 28, 2024

(30) Foreign Application Priority Data
Sep. 22, 2022 (JP) .................. 2022-151801
Dec. 6, 2022 (JP) .................. 2022-195016

(51) Int. Cl.
| | |
|---|---|
| *B41J 2/045* | (2006.01) |
| *B41J 2/21* | (2006.01) |
| *B41J 13/10* | (2006.01) |
| *B41J 29/393* | (2006.01) |
| *H02J 1/00* | (2006.01) |

(52) U.S. Cl.
CPC ......... *B41J 2/0457* (2013.01); *B41J 2/04586* (2013.01); *B41J 2/21* (2013.01); *B41J 13/103* (2013.01); *B41J 29/393* (2013.01); *H02J 1/00* (2013.01)

(58) Field of Classification Search
CPC ........ B41J 2/0457; B41J 2/04586; B41J 2/21; B41J 13/103; B41J 29/393; H02J 1/00
USPC ........................................... 307/52
See application file for complete search history.

(56) References Cited

U.S. PATENT DOCUMENTS

| | | | |
|---|---|---|---|
| 8,862,012 B2* | 10/2014 | Takiguchi | G03G 15/5004 |
| | | | 399/88 |
| 10,423,208 B2 | 9/2019 | Ogushi et al. | |
| 10,647,113 B2 | 5/2020 | Ueki | |
| 2012/0137154 A1* | 5/2012 | Azuma | G03G 15/5004 |
| | | | 713/323 |
| 2022/0105720 A1 | 4/2022 | Ueki et al. | |
| 2022/0260946 A1* | 8/2022 | Okuzono | G03G 15/5004 |

FOREIGN PATENT DOCUMENTS

JP    2001-162897 A    6/2001

* cited by examiner

*Primary Examiner* — Richard Tan
(74) *Attorney, Agent, or Firm* — Venable LLP

(57) ABSTRACT

A power supply control apparatus comprises a first power supply supplying power to a controller and a second power supply supplying power to an operation unit and a power controller. The operation unit receives an operation for switching the first power supply on and off. The power controller is operable to turn on the first power supply according to the signal from a timer or the operation by the operation unit, and to turn off the first power supply according to a state of the controller. The controller, upon at least either of the operation by the operation unit or the signal from the timer, performs a setting to the timer of a time at which to turn on the power from the first power supply or a time at which to turn off the power from the first power supply.

6 Claims, 15 Drawing Sheets

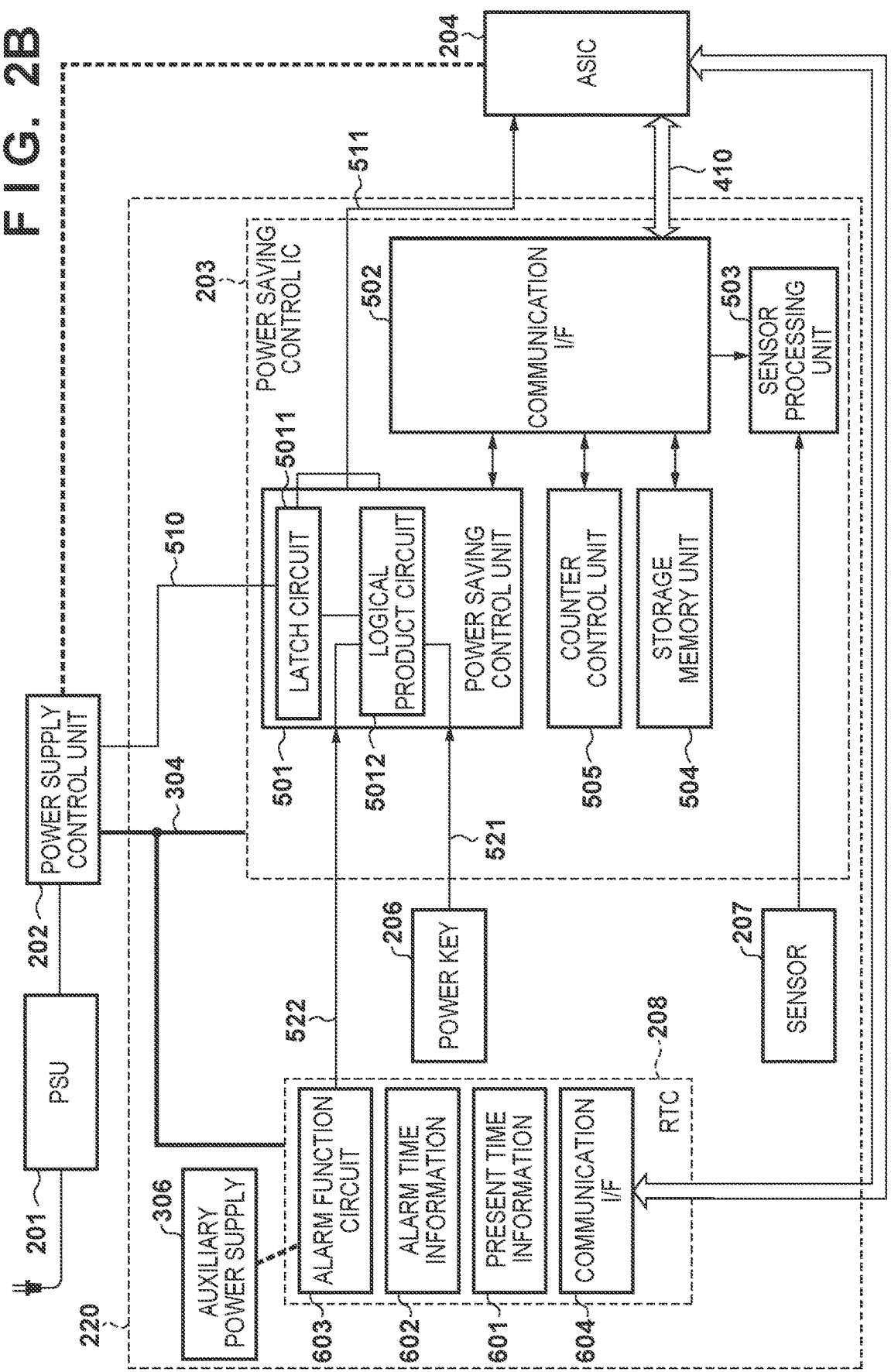

FIG. 6

| | POWER ON | POWER OFF |
|---|---|---|
| SCHEDULE SETTING | 8:00 | 18:00 |
| USER OPERATION PATTERN 1 | – | – |
| USER OPERATION PATTERN 2 | – | 17:00 |
| USER OPERATION PATTERN 3 | 7:00 | – |
| USER OPERATION PATTERN 4 | 7:00 | 17:00 |
| USER OPERATION PATTERN 2B | 18:00 | 17:00 |
| USER OPERATION PATTERN 3B | 7:00 | 8:00 |

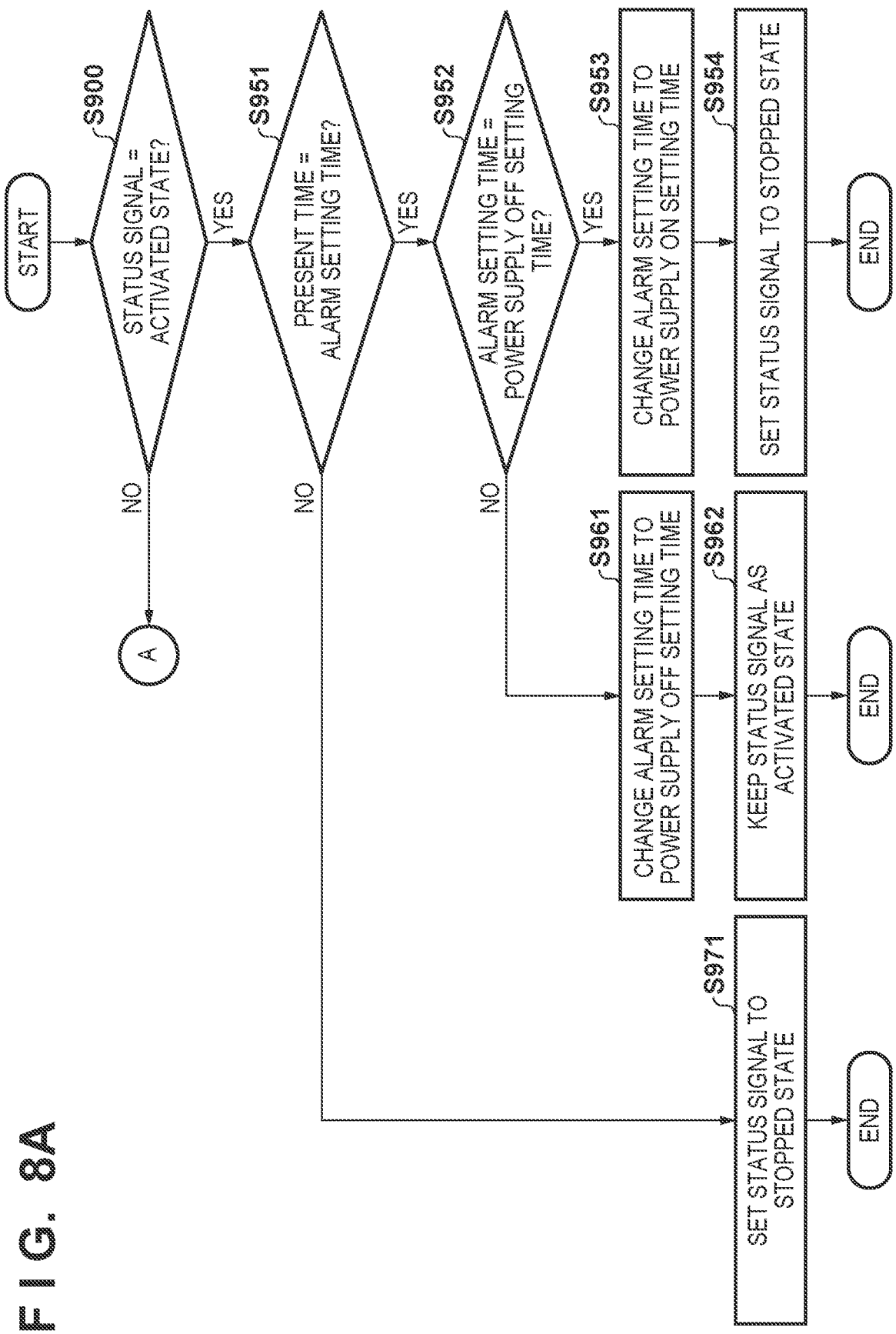

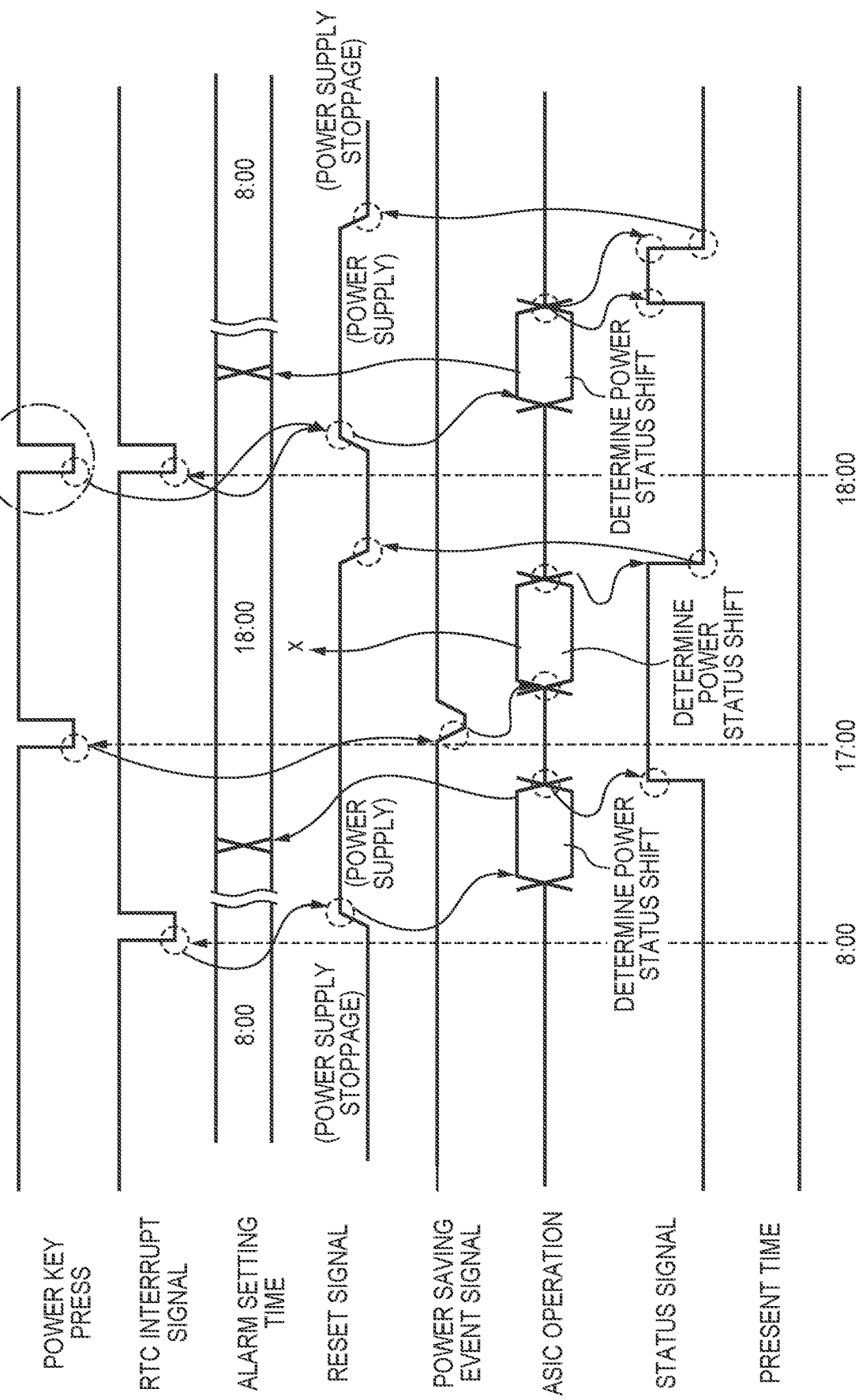

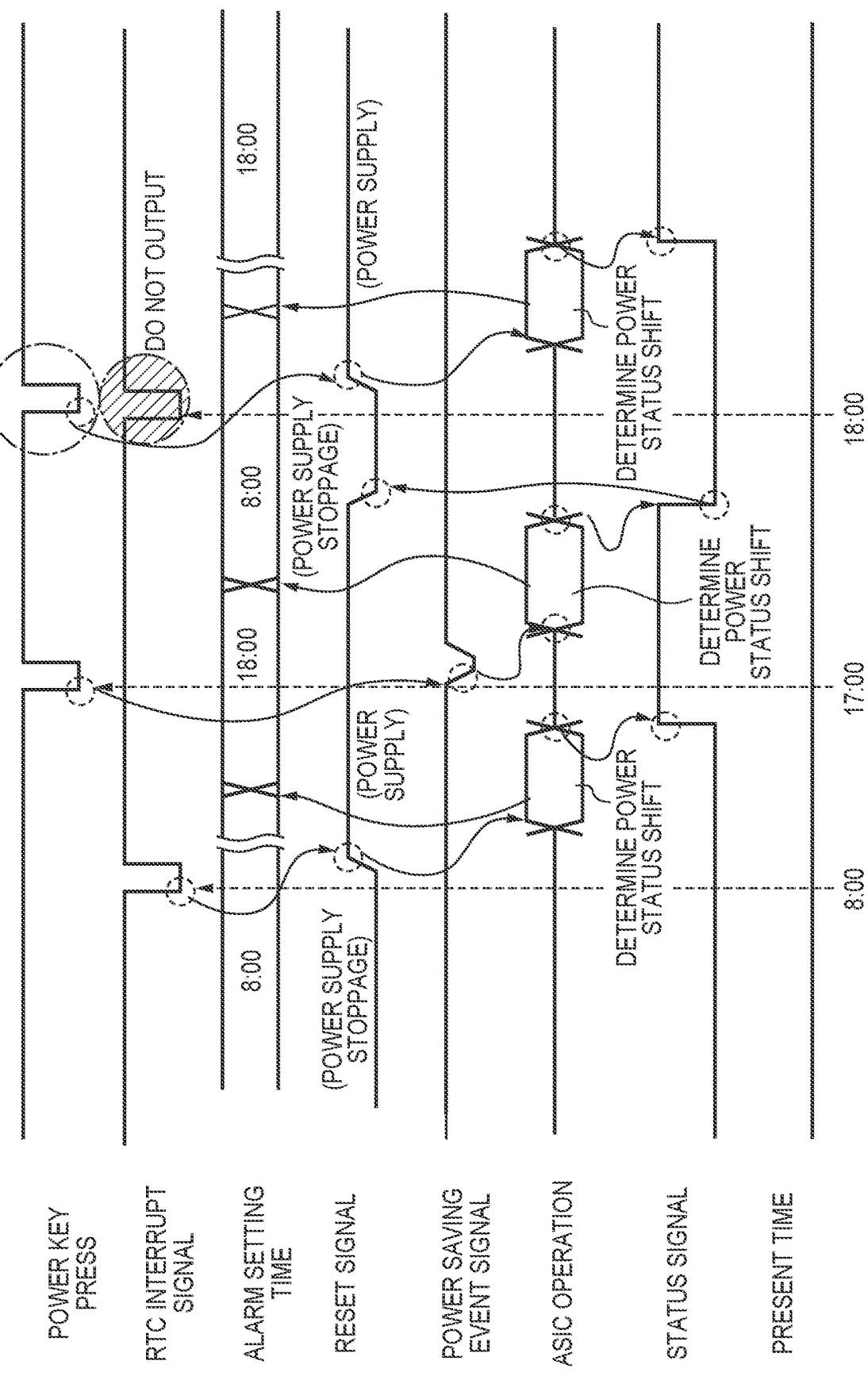

POWER SUPPLY CONTROL APPARATUS, METHOD AND RECORDING APPARATUS

BACKGROUND OF THE INVENTION

Field of the Invention

The present invention relates to a power supply control apparatus and a recording apparatus, and more particularly, to a power supply control apparatus and a recording apparatus that control a supply and stoppage of power to a load based on a user schedule setting.

Description of the Related Art

Japanese Patent Laid-Open No. 2001-162897 proposes an image forming apparatus that includes time measurement means having a dedicated power supply and having an alarm function, and that controls a supply of power to a main control unit based on a schedule setting. Japanese Patent Laid-Open No. 2001-162897 describes stopping the supply of power by the main control unit notifying a cutoff signal to a power supply unit when the power supply is turned off, and, at that time, setting the time at which the time measurement means is to output an alarm signal to the time at which the power supply it to be turned on next. Japanese Patent Laid-Open No. 2001-162897 describes that the supply of power is started by the time measurement means notifying the alarm signal to the power supply unit when the power is turned on.

The configuration described in Japanese Patent Laid-Open No. 2001-162897 is considered sufficient in a case where the supply of power is controlled based only on the schedule setting. However, in a configuration including both a power key for turning on the power supply and a scheduling function, each of which is related to control of the power supply to the main control unit, a manual operation performed directly on a device such as a power key has a high priority for usability. Therefore, there is a need for a configuration by which it is possible to realize a scheduling function on the basis of a configuration in which power supply control according to the power key is prioritized. In addition, there is a possibility that the user will operate the power key around when the supply of power is started or stopped based on the schedule setting (power supply off setting time and power supply on setting time), and a control sequence that takes this into consideration is also necessary.

SUMMARY OF THE INVENTION

The present invention provides a power supply control apparatus and a recording apparatus that can supply power and stop power based on a schedule setting in consideration of a user operation.

The present invention has the following configuration. According to one aspect of the present invention, there is provided a power supply control apparatus, comprising: a first power supply unit operable to switch a supply of power on and off; a second power supply unit configured to perform a continuous supply of power; a controller configured to operate by a power supply from the first power supply unit; a timer configured to operate by a power supplied from the second power supply unit or a dedicated power supply, and to output a signal when a set time is reached; and an operation unit configured to operate by a power supply from the second power supply unit, and for an operation by which a user switches the supply of power from the first power supply unit on and off; and a power controller configured to operate by a power supply from the second power supply unit, and operable to turn on the supply of power from the first power supply unit in accordance with the signal from the timer or the operation by the operation unit, and to turn off the supply of power from the first power supply unit in accordance with a state of the controller, wherein the controller, upon at least either of the operation by the operation unit or the signal from the timer, performs a setting to the timer of a time at which to turn on the supply of power from the first power supply unit or a time at which to turn off the supply of power from the first power supply unit and performs a setting of the state of the controller, in accordance with the state of the controller.

According to another aspect of the present invention, there is provided a recording apparatus, comprising a power supply control apparatus, and a recording unit for recording an image on a medium, wherein the power supply control apparatus comprises a first power supply unit operable to switch a supply of power on and off; a second power supply unit configured to perform a continuous supply of power; a controller configured to operate by a power supply from the first power supply unit; a timer configured to operate by a power supplied from the second power supply unit or a dedicated power supply, and to output a signal when a set time is reached; and an operation unit configured to operate by a power supply from the second power supply unit, and for an operation by which a user switches the supply of power from the first power supply unit on and off; and a power controller configured to operate by a power supply from the second power supply unit, and operable to turn on the supply of power from the first power supply unit in accordance with the signal from the timer or the operation by the operation unit, and to turn off the supply of power from the first power supply unit in accordance with a state of the controller, wherein the controller, upon at least either of the operation by the operation unit or the signal from the timer, performs a setting to the timer of a time at which to turn on the supply of power from the first power supply unit or a time at which to turn off the supply of power from the first power supply unit and performs a setting of the state of the controller, in accordance with the state of the controller.

According to the present invention, it is possible to provide a power supply control apparatus and a recording apparatus with a configuration by which it is possible to supply power and stop power based on a schedule setting in consideration of a user operation.

Further features of the present invention will become apparent from the following description of exemplary embodiments with reference to the attached drawings.

BRIEF DESCRIPTION OF THE DRAWINGS

FIG. 2B is a view illustrating a control circuit for controlling a supply of power to an ASIC.

FIG. 6 is a view illustrating a user operation time pattern.

FIG. 8A is a flowchart in which the RTC setting content is changed based on the timing.

FIG. 9A is a view illustrating a control sequence example 2 in which RTC setting content is changed based on the timing.

FIG. 11A is a view illustrating the control sequence example 1 in which RTC setting content is changed taking into consideration the power key.

DESCRIPTION OF THE EMBODIMENTS

Figure 1:
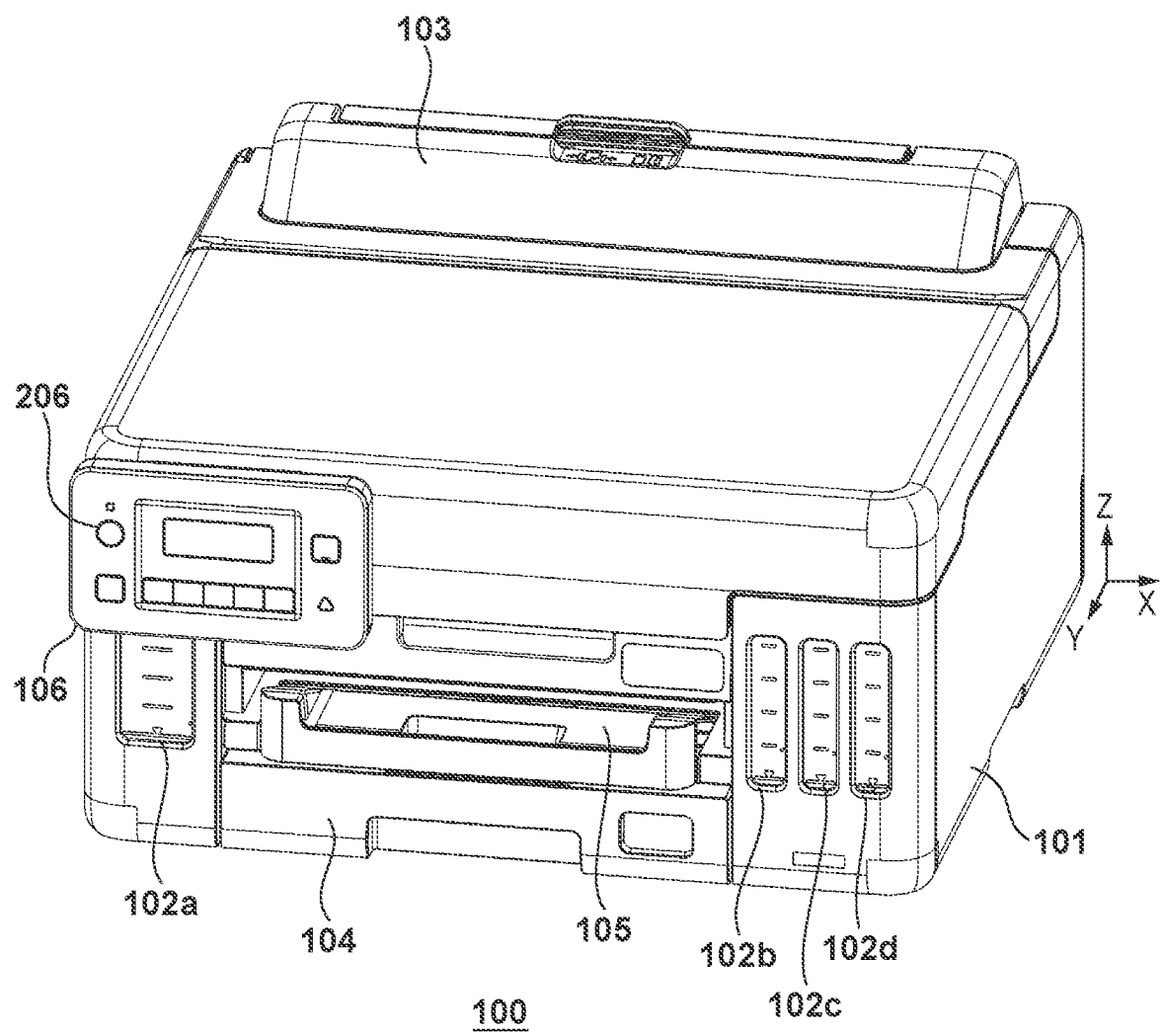
FIG. 1 is a view illustrating an outer appearance of an inkjet recording apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

<Description of Inkjet Recording Apparatus (FIG. 1)>

FIG. 1 is an external perspective view illustrating an outline of an inkjet recording apparatus 100 (hereinafter referred to as the recording apparatus) as representative of recording apparatuses to which the present invention can be applied. As illustrated in FIG. 1, the recording apparatus 100 includes a housing (exterior portion) 101, a recording head (not illustrated) that performs a recording operation on a recording medium, and an ink tank 102 that serves as an ink storage container for storing ink to be supplied to the recording head. The ink tank 102 is disposed on the front surface of a housing 101, and the recording head and the ink tank 102 are connected to each other for each color by an ink channel corresponding to each ink. A black ink tank 102a is attached to the left side when viewed from the front of the recording apparatus, and a cyan ink tank 102b, a magenta ink tank 102c, and a yellow ink tank 102d are attached to the right side when viewed from the front of the recording apparatus. In addition, the recording apparatus 100 includes a sheet tray 103 and a sheet cassette 104 as sheet feeding units for feeding a recording medium such as paper into the apparatus. After completion of recording thereto, the recording medium is discharged from a discharge unit 105 to the outside of the recording apparatus 100. The recording apparatus 100 also includes an operation unit 106 that allows a user to perform an operation such as command input.

Further, the operation unit 106 is provided with a power key (also referred to as a soft power supply button or simply an operation unit) 206 for the user to manually turn on or off the power. Rather than a power supply switch that physically connects or disconnects the power supply, the power key 206 may be a button that outputs a signal indicating that the power key has been operated (i.e., pressed). A power supply switch that physically connects or disconnects the power supply may be arranged separately from the power key, for example, on a side surface or a rear surface of the housing 101. Power is supplied to a PSU 201 from, for example, a commercial AC power supply by turning on the power supply switch. Note that power key is a name adopted for convenience, and any shape or mechanism may be used as long as a signal indicating that the power key has been operated can be output. In addition, instead of being provided in the operation unit 106, the power key may be provided in another portion of the housing 101.

<Supply of Power in Configuration for Controlling Inkjet Recording Apparatus (FIG. 2A)>

A configuration for controlling the power supply of the recording apparatus 100 will now be described with reference to FIG. 2A. Although actual inkjet recording apparatuses have a more complicated configuration using a plurality of integrated circuits (IC), components related to the present embodiment will be described here. A power supply control unit 202, a power saving control IC 203, and an application specific IC (the ASIC) 204 are configured to include a plurality of processing units in one processing block for convenience of explanation. However, an independent configuration can be adopted for each processor, or a configuration in which the power supply control unit 202 and the power saving control IC 203 are one IC can be adopted. Note that, in FIG. 2A, only a power supply and a configuration for controlling the power supply are illustrated, and these as a whole may be referred to as a power supply control apparatus. In addition, the inkjet recording apparatus 100 includes a recording unit constituted by an electronic circuit, a machine, or the like for forming an image on a medium by an actuator such as a motor driven by a supplied power, and a processing unit for generating and processing an image to be recorded.

Configuration of the Power Supply Control Unit 202

When the power supply unit (PSU) 201 is supplied with power from the outside of the apparatus, it is converted into a DC voltage that is easy to use in the recording apparatus 100 such as 32V or 24V by AC/DC conversion. The power supply control unit 202 receives an output voltage of the PSU 201, and generates a power supply with a further reduced voltage such as 5V, 3.3V, 0.9V by a regulator 301 and a DC-DC converter 302. A regulator power supply 304 outputted from the regulator 301, while connected to an AC power supply, is constantly supplied to the power saving control IC 203 and a real time clock (the RTC) 208. Meanwhile, a system power supply 305 outputted from the DC-DC converter 302 is supplied to the ASIC 204. The supply of power of the system power supply 305 can be switched on and off in accordance with control of a reset control unit 303. Upon receiving a reset signal 510 from the power saving control IC 203, the reset control unit 303 shifts the power supply control unit 202 to a reset state. For example, the reset control unit 303 may set the power supply control unit 202 to a reset state at a falling edge of the reset signal 510, and may set the power supply control unit 202 to a reset state in response to a status signal from a communication interface (I/F) 502.

The system power supply 305 is turned off in the reset state, that is, the supply is stopped, and the system power supply 305 is turned on in a reset release state, that is, the power is supplied. At this time, the regulator power supply 304 outputted from the regulator 301 is constantly supplied to the power saving control IC 203 and the RTC 208 at a predetermined voltage while the power is supplied from the PSU 201 regardless of the reset state of the power supply control unit 202.

On the other hand, the DC-DC converter 302 stops outputting the system power supply 305 in the reset state. In other words, the recording apparatus 100 can transition to a lowest power status by completely stopping the system power supply 305 that is supplying power to the ASIC 204.

Figure 2A:
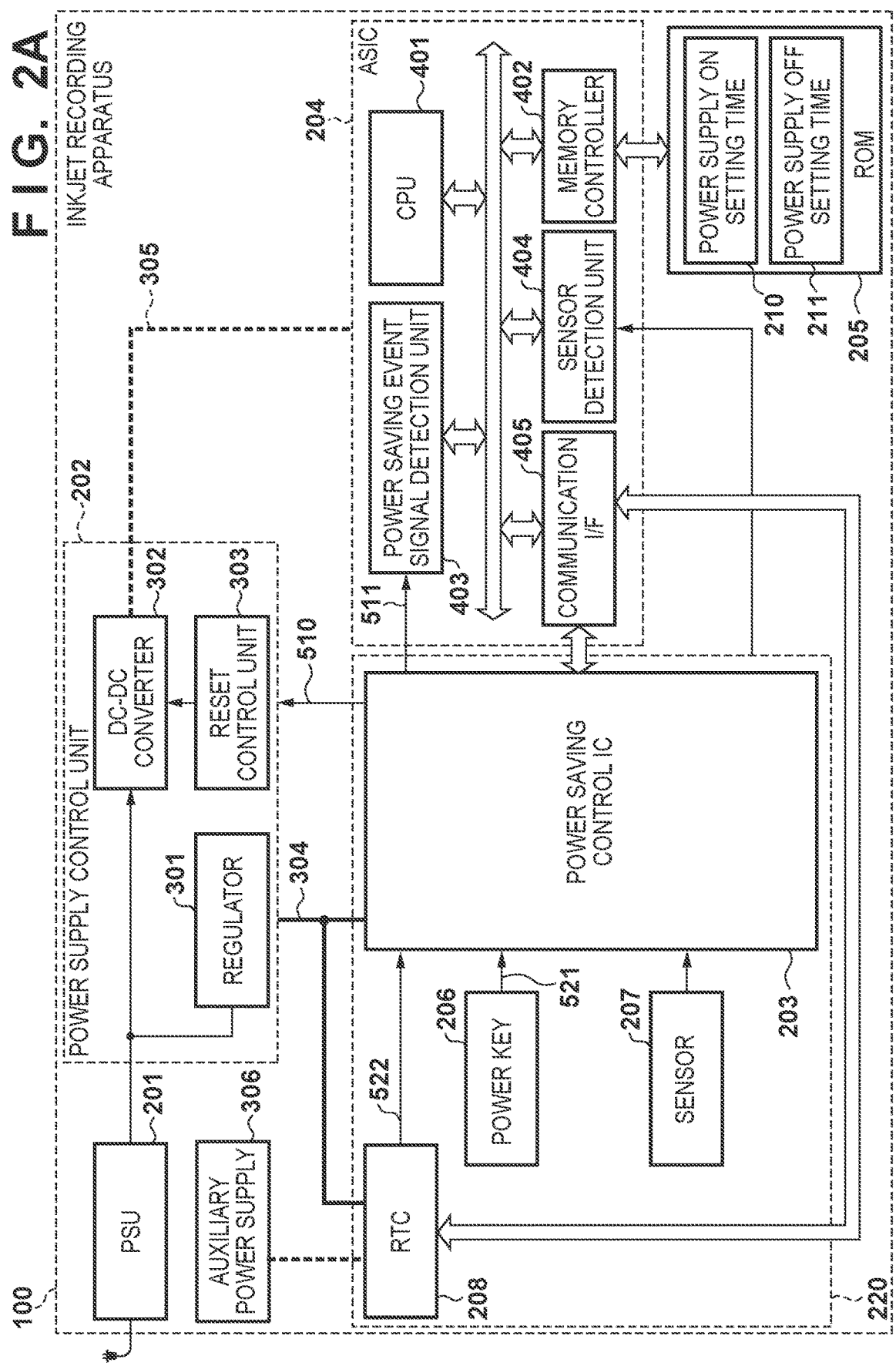
FIG. 2A is a view illustrating a supply of power in a configuration for controlling the inkjet recording apparatus.

In FIG. 2A, the regulator power supply 304 is supplied to the RTC 208, but when time needs to be measured when there is no supply of power from the outside of the device, power can also be supplied using an auxiliary power supply 306 such as a coin battery.

Configuration of the ASIC 204

Next, internal blocks of the ASIC 204 will be described. When the power supply to the ASIC 204 is turned on by the system power supply 305, a CPU 401 executes a control program stored in a ROM 205 via a memory controller 402, and starts controlling the recording apparatus 100. That is, the ASIC 204 functions as a control unit of the recording apparatus 100. A power saving event signal detection unit 403 may detect a power saving event signal 511 which is a control signal of the power saving control IC 203. By detecting the power saving event signal 511, the recording apparatus 100 can transition to another power state. A sensor detection unit 404 can similarly detect the state of a sensor 207 inside the device via the power saving control IC 203. The ASIC 204, particularly the CPU 401, performs required processing as appropriate upon detecting a state change of the sensor 207.

Further, the ASIC 204 may communicate with the power saving control IC 203 via a communication I/F 405. The ASIC 204 can also communicate with the RTC 208 via the communication I/F 405, and can access internal registers and the like of the RTC 208. The protocol used in the communication I/F 405 may be a protocol of an I2C or UART interface, or may be a protocol for connection by high-speed communication such as PCIe. The communication protocol of the communication I/F 405 may be determined together with the corresponding interface according to the circumstances of the device. When communication schemes of the power saving control IC 203 and the RTC 208 differ from each other, communication may be performed by separate I/Fs, and the power saving control IC 203 and the RTC 208 may be controlled on the same bus in the case of I2C or the like.

The ROM 205 is a non-volatile memory that retains data even if power is not supplied to the ASIC 204. In addition, the ROM 205 of the present embodiment can be rewritten by the ASIC 204.

The ROM 205 includes, in addition to a program, a power supply on setting time storage unit 210 and a power supply off setting time storage unit 211 for storing the power supply on setting time and the power supply off setting time which are set by using the operation unit 106 or the like, respectively. These setting times are information for switching the state of the recording apparatus 100 between an operable state (soft on) and a standby state (soft off), which will be described later. This will be described later in the section of <Control configuration of time scheduling function in present embodiment>.

<Control Circuit for Controlling Supply of Power to the ASIC (FIG. 2B)>

A control circuit for controlling the supply of power to the ASIC 204 will be described with reference to FIG. 2B. FIG. 2B is a diagram illustrating the inside of the RTC 208 and the power saving control IC 203 illustrated in FIG. 2A. Here, internal blocks of the power saving control IC 203 will be described.

A power saving control unit 501 controls the reset signal 510 with respect to the reset control unit 303 of the power supply control unit 202. The power key 206 and the RTC 208 are connected to the power saving control unit 501. Here, in order to realize the power saving control IC 203 with simple logic, it is preferable that the power saving control unit 501 outputs the reset signal 510 and the power saving event signal 511 without distinguishing between power key and RTC interrupt signal input. In the present embodiment, for example, a signal of a logical product of a power key signal 521 and an RTC interrupt signal 522 is generated by a logical product 5012 inside the power saving control unit 501.

The logical product signal is output as the power saving event signal 511, latched by a latch 5011, and output as the reset signal 510. As a result, the ASIC 204 can detect the power key signal 521, which indicates that the power key 206 has been pressed, and can detect the RTC interrupt signal 522, which indicates that the set alarm time has been reached from the RTC 208. Here, it is assumed that the power key signal 521 and the RTC interrupt signal 522 are active low (negative logic) signals, and a negative value indicates active (key press and interrupt generation) for each of the signals. When the latch 5011 is holding the reset release state (negative value), the value thereof is not changed by the power key signal 521 or the RTC interrupt signal 522. When the latch 5011 is holding the reset release state (negative value), the latch 5011 the value thereof is changed to positive in response to the status signal from the communication I/F 502 switching from the activated state to the stopped state. Accordingly, the reset signal 510 output from the power saving control unit 501 changes from the reset release state to the reset state. The RTC 208 includes a present time information holding unit 601 that holds present time information.

The RTC 208 of the present example has a dedicated power supply such as a battery, and can continue measuring time even if the AC power supply to the recording apparatus is lost. Further, the RTC 208 includes a settable alarm time information holding unit 602, and when the present time reaches the alarm time, an alarm function circuit 603 outputs the interrupt signal (alarm notification) 522. Here, the reading of the present time of the RTC 208 and the setting of the alarm time can be performed from the ASIC 204 via a communication I/F 604. In the setting of the alarm time, for example, the ASIC 204 may write a time inputted by the operation unit 106 via a predetermined user interface to the alarm time information holding unit 602 or set a time to the RTC 208 based on the control by the ASIC 204. The present time information may also be adjusted from the ASIC 204. The RTC 208 may also operate on the regulator power supply 304. However, in such a case, it is necessary to reset the real time every time the AC power supply is lost.

As described above, the power saving control unit 501 monitors the power key signal 521 and the RTC interrupt signal 522 when the supply of the regulator power supply 304 is being received. Further, the power saving control unit 501 outputs the power saving event signal 511 after receiving the power key signal 521 or the RTC interrupt signal 522, and notifies the power saving event signal detection unit 403 of the ASIC 204 of detection of these signals. In this way, when the system power supply 305 is supplied to the ASIC 204 (in the soft on state), the ASIC 204 is configured to be able to detect that the power key was pressed or to detect an alarm notification from the RTC 208.

When the ASIC 204 has detected a change in at least either of the power key signal 521 and the RTC interrupt signal 522 in the soft on state (that is, the reset release state), the ASIC 204 performs a stoppage process for turning off the power. When the stoppage process is completed and preparation has been made, a signal value indicating the stopped state of the ASIC 204 is outputted to the communication I/F 502 by a status signal 410 (a signal in the communication I/F). The power saving control unit 501 receives the status signal 410 via the communication I/F 502, and controls the reset signal 510. Specifically, the power saving control unit 501 changes the reset signal from the reset release state to the reset state in response to reception of the status signal 410 indicating the stopped state of the ASIC 204. This causes the DC-DC converter 302 to stop the system power supply 305. Conversely, when the reset signal changes from the reset state to the reset release state, the DC-DC converter 302 starts supplying the system power supply 305. As described above, the power status of the recording apparatus 100 can be switched by controlling the output of the DC-DC converter 302 of the power supply control unit 202 by controlling the reset signal 510.

The communication I/F 502 is connected to a counter control unit 505 and a storage memory unit 504, but these are not directly related to the power control of the present embodiment, and therefore, explanation thereof is omitted.

<Definition of Power State in Present Embodiment>

The recording apparatus 100 has two states: an operable state in which power is supplied to the ASIC 204 and a standby state in which power is stopped from being supplied to the ASIC 204. In the standby state, a supply of power from the outside of the recording apparatus 100 is performed, but the supply of power to the ASIC 204, which is the main control unit, is stopped. In the present embodiment, the operable state includes operation modes in which the device can accept a predetermined operation because power is supplied to the ASIC 204, such as a soft on state, a power-saving state, and an automatic power on enabled state.

The soft on state is a state in which power necessary for the recording operation is supplied and the recording apparatus 100 can be operated from a display unit. The power saving state is a state in which the supply of power to function blocks which are not being used when there has not been an operation temporarily is stopped. An automatic power on enabled state is a state in which the display unit is in an off state, but the state can be immediately shifted to the soft on state when a print job is received via communication by a USB or a wireless LAN or the like.

On the other hand, in the standby state, the supply of power to the ASIC 204 is stopped, and when a particular operation is accepted, the recording apparatus 100 shifts to the operable state. The operable state, into which the recording apparatus 100 shifts from the standby state, may be any of the soft on state, the power-saving state, and the automatic power ON enabled state, but in the present embodiment, the state is set to the soft on state from the viewpoint of convenience.

In the present embodiment, the soft off state in which an operation on the power key 206 is awaited means the same thing as the standby state in the present embodiment. When the power key 206 is pressed, the recording apparatus 100 in the soft off state shifts to the soft on state, and when the power key 206 is pressed, the recording apparatus 100 in the soft on state shifts to the soft off state.

<Activation Sequence when Power is Turned on (FIG. 3)>

Figure 3:
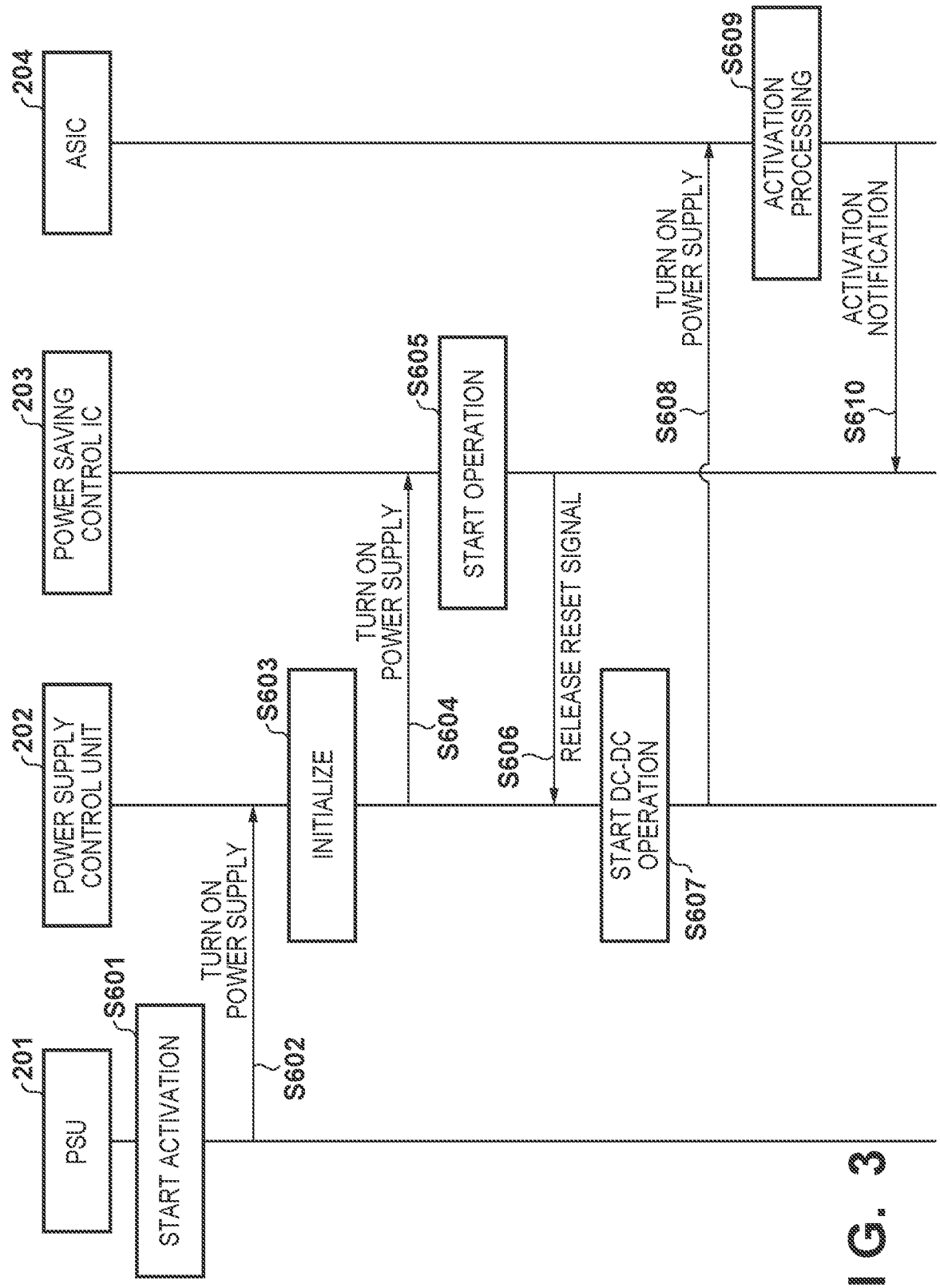
FIG. 3 is an activation sequence diagram for when a power supply is input.

With reference to FIG. 3, an activation sequence when the power supply to the recording apparatus 100 is turned on will be described.

(step S601) When power is supplied from the outside, the PSU 201 starts generating the power supply voltage to be used in the device. Power is supplied to the PSU 201 by, for example, turning on the previously-described power supply switch (not illustrated) or connecting a power cord to an AC power supply.

(step S602) The power of the power supply generated by the PSU 201 is supplied to the power supply control unit 202.

(step S603) When power is supplied, the power supply control unit 202 starts the operation of the regulator 301.

(step S604) The power supply control unit 202 supplies the regulator power supply 304. Thus, power is also supplied to the power saving control IC 203.

(step S605) The power saving control IC 203 starts to operate when power is supplied. When the regulator power supply 304 is turned on, reset processing is performed in the power saving control IC 203. In addition, the reset signal 510 is output.

(step S606) The power saving control IC 203 releases (turns off) the reset signal 510 to the reset control unit 303 of the power supply control unit 202 at the time of the reset in the power saving control IC 203 in step S605.

(step S607) When the reset signal 510 is released by the power saving control IC 203, the DC-DC converter 302 starts to operate.

(step S608) The power supply control unit 202 starts the system power supply 305 to the ASIC 204.

(step S609) When the ASIC 204 is supplied with power, the control program stored in the ROM 205 is executed and an activation process is started.

(step S610) The ASIC 204 notifies the power saving control IC 203 of the activation when the activation process proceeds and activation preparation is completed.

When the ASIC 204 detects the power key 206 after the activation, the ASIC 204 can shift to the soft on state in which a user can perform operations directly. Further, after the processing of step S606, the state can be switched according to user-set information by reading the information from the ROM 205 when the supply of power is started. For example, when the above-described switch to the automatic power ON enabled state is set, the ASIC 204 shifts to the automatic power ON enabled state. When it is determined that it is not necessary to maintain the soft on state after the shift to the soft on state, the transition to the power-saving state is performed to realize power saving. This determination may be based on, for example, that a job is has not been received or a user operation has not been performed for a predetermined period of time.

<Sequence for Shift from the Operable State to the Standby State (FIG. 4)>

Figure 4:
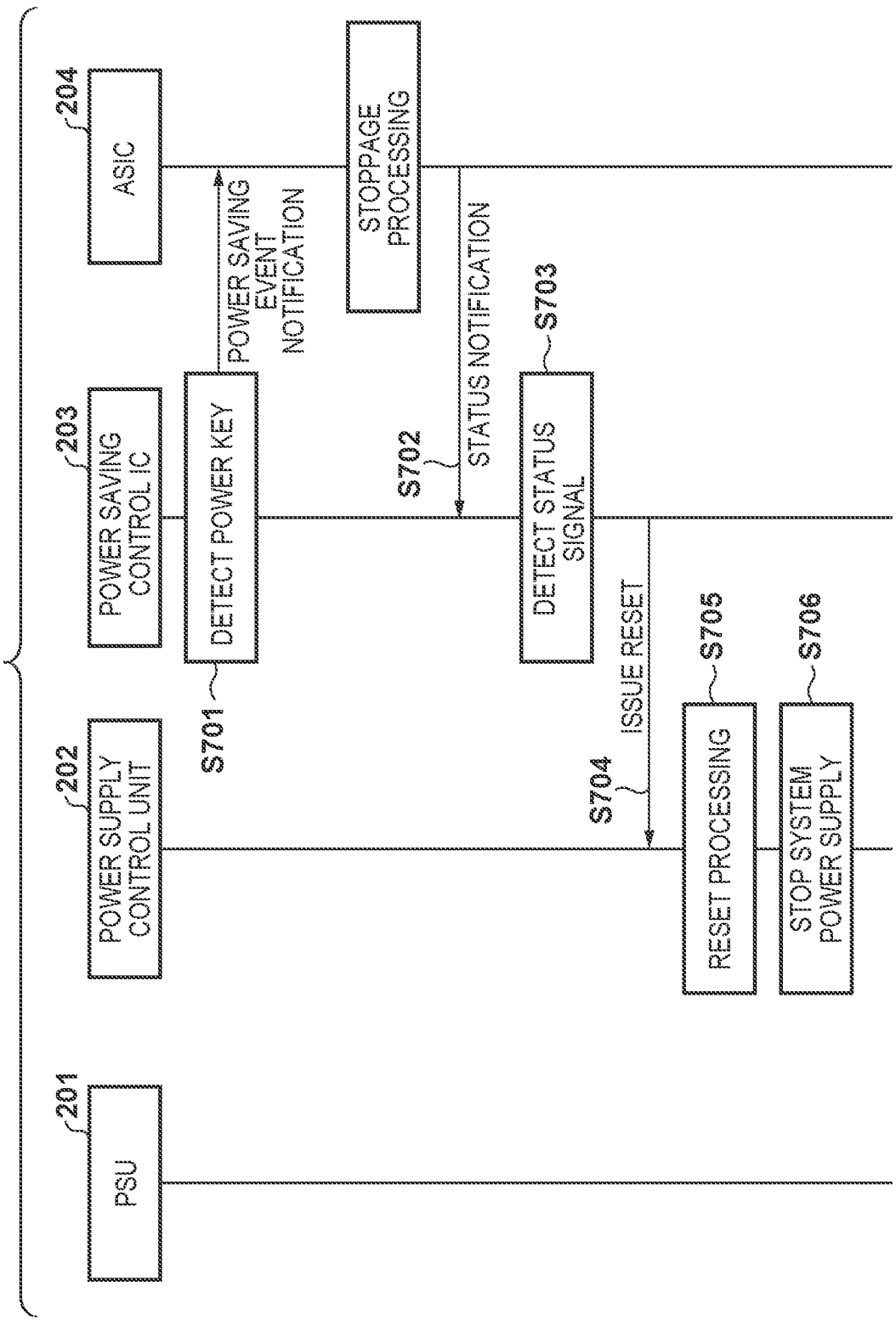
FIG. 4 is a sequence diagram for a transition from an operable state to a standby state.

Here, a sequence in a case where the recording apparatus 100 transitions from the operable state to the standby state will be described with reference to FIG. 4.

(step S701) When the power saving control IC 203 detects that the power key 206 has been pressed by the power key signal 521 in the operable state, the power saving control IC 203 sends a power saving event notification to the ASIC 204 by the power saving event signal 511. In response, the ASIC 204 initiates a stoppage process.

(step S702) When the stoppage process is completed, the ASIC 204 issues a status notification indicating the completion of the stoppage process to the power saving control IC 203. This notification is made by the status signal 410 described above. The stoppage process is a process for preparing for stopping the supply of power thereafter, and may include processing up to the issuance of the status notification.

(step S704) The power saving control IC 203 issues the reset signal 510 to the power supply control unit 202 upon receiving the status notification indicating completion of the stoppage process.

(step S705) Upon receiving the reset signal 510, the power supply control unit 202, in particular, the reset control unit 303, performs a reset process inside the power supply control unit 202, and stops the operation of the DC-DC converter 302.

(step S706) The power supply control unit 202 stops the supply of power to the ASIC 204. Step S706 is a step described for visualizing the stoppage of supplying the power. Since the supply of power to the ASIC 204 is stopped in step S705, there is no need to perform any particular processing in step S706.

By performing the processing of the above-described step S701 to step S706, the recording apparatus 100 can transition from the operable state to the standby state. In the above procedure, the procedure of transitioning to the standby state in response to reception of the power key signal 521 has been described, but a similar procedure applies even with the RTC interrupt signal 522 when the power supply off setting time is reached.

<Sequence for Shift from the Standby State to the Operable State (FIG. 5)>

Figure 5:
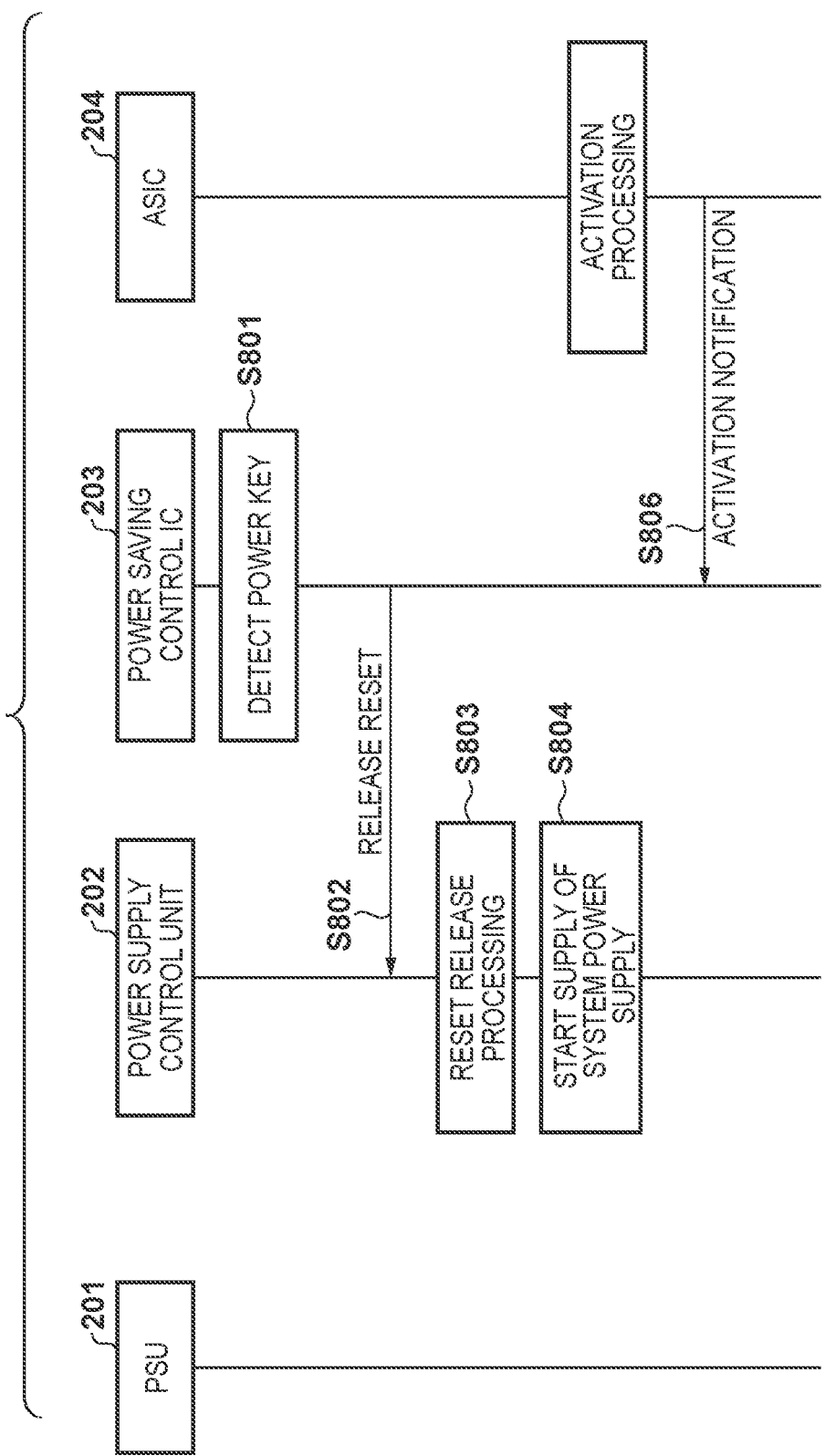
FIG. 5 is a sequence diagram for a transition from the standby state to the operable state.

Next, an operation of the recording apparatus 100 detecting that the power key 206 has been pressed in the standby state and shifting to the operable state will be described with reference to the sequence diagram illustrated in FIG. 5.

(step S801) The power saving control IC 203 receives the power key signal 521 and detects pressing of the power key 206.

(step S802) The reset signal 510 is transmitted to the power supply control unit 202 to release the reset of the power supply control unit 202. Note that configuration may be such that the reset signal 510 is maintained at a value indicating a reset during the reset state, or such that the reset signal 510 is maintained at a signal value by a latch included in the reset control unit 303. In the latter case, the reset is released when the reset signal 510 is received in the reset state.

(step S803) The power supply control unit 202 performs a reset release process in response to the reset signal 510, and starts the operation of the DC-DC converter 302.

(step S804) The power supply control unit 202 starts the system power supply to the ASIC 204. Step S804 is a step described for visualizing the start of supplying the power. Since the supply of power to the ASIC 204 is started in step S803, there is no need to perform any particular processing in step S804.

(step S805) The ASIC 204 is supplied with power, the control program stored in the ROM 205 is executed via the memory controller 402, and the activation process is started in accordance with the program.

(step S806) The ASIC 204 notifies the power saving control IC 203 of the status signal 410 indicating the activated state when the activation process is completed.

By performing the processing of the above-described step S801 to step S806, the recording apparatus 100 can transition from the operable state to the standby state. In the above procedure, the procedure of transitioning to the standby state in response to reception of the power key signal 521 has been described, but a similar procedure applies even with the RTC interrupt signal 522 when the power supply on setting time is reached.

<Control Configuration of Time Scheduling Function in Conventional Soft Off State>

The time scheduling function is a function of setting, to the main unit in advance, a time schedule for turning on/off the power supply, and shifting the power state based on the set schedule. For example, it is possible to set the main body to be powered on at 8:00 and powered off at 18:00 every day, for example, and it is possible not only to reduce the unnecessary cost of power due to forgetting to turn off the power, but also to reduce the management load of checking that the device is turned off or the like.

Conventionally, the soft off state is not a standby state in which the power supply to the ASIC is stopped (hereinafter, referred to as the conventional soft off state). The conventional soft off state refers to a state in which the power supply is reduced by allowing only the power key to be accepted by the ASIC 204 while supplying power to the ASIC 204. That is, the conventional soft off state is a state in which power is supplied to the ASIC, and the clock inside the ASIC is operable and in a time measuring state. When power is supplied to the ASIC, a periodic timer interrupt is enabled, and the CPU can repeatedly be periodically restored from and shifted into the power saving mode, and the process can be executed as long as the process is short and does not affect the standby power in the restoration period. Here, when the scheduling function is enabled, the schedule setting information held in the storage unit and the clock of the ASIC are referred to when the periodic timer interrupt is received, and when the ASIC clock has reached the time at which to turn on the power supply, the soft on state is shifted into. Further, in the soft on state, when the periodic timer interrupt is received, the schedule setting information held in the storage unit and the clock of the ASIC are referred to, and in a case where the time at which to turn off the power supply has been reached, the soft off state is shifted into.

<Control Configuration of the Time Scheduling Function in the Present Embodiment>

Standards for energy saving requirements are regularly revised, and standards are formulated in a manner that differentiates products with high energy saving performance. Therefore, a performance value that had been sufficient for a standard of a certain period, may not meet a new standard due to a revision to the standard. Accordingly, it is necessary to select a configuration capable of realizing a minimum power state in which power is suppressed as much as possible in the main body.

When the soft off state is a state in which the supply of power to the ASIC is stopped, the ASIC cannot receive the periodic timer interrupt as in the conventional soft off state (a state in which the supply of power to the ASIC is performed) described above. When the periodic timer interrupt signal is used, a periodic supply and stoppage of power to the ASIC can be repeated, but an initialization process and a termination process are performed, unlike with the switching of the CPU operation modes.

Therefore, it is difficult to perform the supply of power supply and stoppage of the power supply in a short enough time that the standby power is not affected. Therefore, in the present embodiment, in order to perform the time scheduling function, an alarm function of the RTC for outputting an interrupt signal when a set time (hereinafter, referred to as an alarm time) is reached is used.

The power of the time scheduling function being on/off in the present embodiment corresponds to the operable state/standby state, respectively, in the definition of the power state in the present embodiment. That is, the recording apparatus 100 enters the operable state (soft on state) when the power supply of the time scheduling function is turned on, and the recording apparatus 100 enters the standby state (soft off state) when the power supply of the time scheduling function is turned off <Time Pattern of User Operation (FIG. 6)>

When the scheduling function is enabled, a user operation may be performed. For example, there is a possibility that the power key 206 will be operated by a user around when the supply of power is started or stopped based on the schedule setting (power supply off time and power supply on time). Here, it can be said that a user operation performed at the device such as a power key press has a high priority in usability. In the present embodiment, a control configuration for controlling the supply of power to the ASIC 204 based on the schedule setting and a control sequence capable of realizing the supply and stoppage of power to the ASIC 204 based on the schedule setting while prioritizing the power key operation are proposed. Firstly, FIG. 6 illustrates an example of a time pattern of user operations with respect to schedule setting.

(Schedule Setting)

The power supply on time is set to 8:00 and the power supply off time is set to 18:00.

(User Operation Pattern 1)

User operation 1 is a pattern without a user operation. Since the shift of the power state is based on the schedule setting, the shift to the soft on state is according to the RTC interrupt signal 522, and the shift to the soft off state is also according to the RTC interrupt signal 522.

(User Operation Pattern 2)

User operation pattern 2 is a pattern in which the user presses the power key at 17:00 to turn off the power. The pattern is such that the power off due to the user operation is between the power supply on setting time and the power supply off setting time of the schedule setting, and the shift to the soft on state is according to the RTC interrupt signal 522 and the shift to the soft off state is according to the power key signal 521

(User Operation Pattern 3)

User operation pattern 3 is a pattern in which the user presses the power key at 7:00 to turn on the power. The pattern is such that the power supply is turned on by a user operation prior to the power supply on setting time of the schedule setting, and the shift to the soft on state is according to the power key signal 521 and the shift to the soft off state is according to the RTC interrupt signal 522.

(User Operation Pattern 4)

User operation pattern 4 is a pattern in which the user presses the power key at 7:00 and 17:00 to turn on and off the power, respectively. Since the shift of the power state is based on the pressing of the power key, the shift to the soft on state is the power key signal 521, and the shift to the soft off state is the power key signal 521. Since user operation pattern 4 is a combination of the user operation patterns 2 and pattern 3, the description thereof will be omitted hereinafter.

In the user operation pattern 4, the operation of the power supply is limited to the manual operation of the user. Here, in the transition sequence of FIG. 4 and FIG. 5, the detection of the pressing of the power key 206 in each of step S701 and step S801 is assumed to be the starting point of processing for turning off/on the power supply. In contrast to this, in the user operation pattern 1, the operation of the power supply is limited to the RTC. Further, in the present embodiment, the power saving control unit 501 in configured to not distinguish power key input and RTC interrupt signal input. In the transition sequence of FIG. 4, in step S701, the RTC interrupt signal 522 according to the power supply off setting time being reached is detected, and the transition sequence is similar thereafter. In the transition sequence of FIG. 5, in step S801, the RTC interrupt signal 522 due to the power supply on setting time being reached is detected, and the transition sequence is similar thereafter.

<Control Procedure for Changing the RTC Setting Content Based on the Time (FIG. 8A, FIG. 8B)>

Figure 8B:
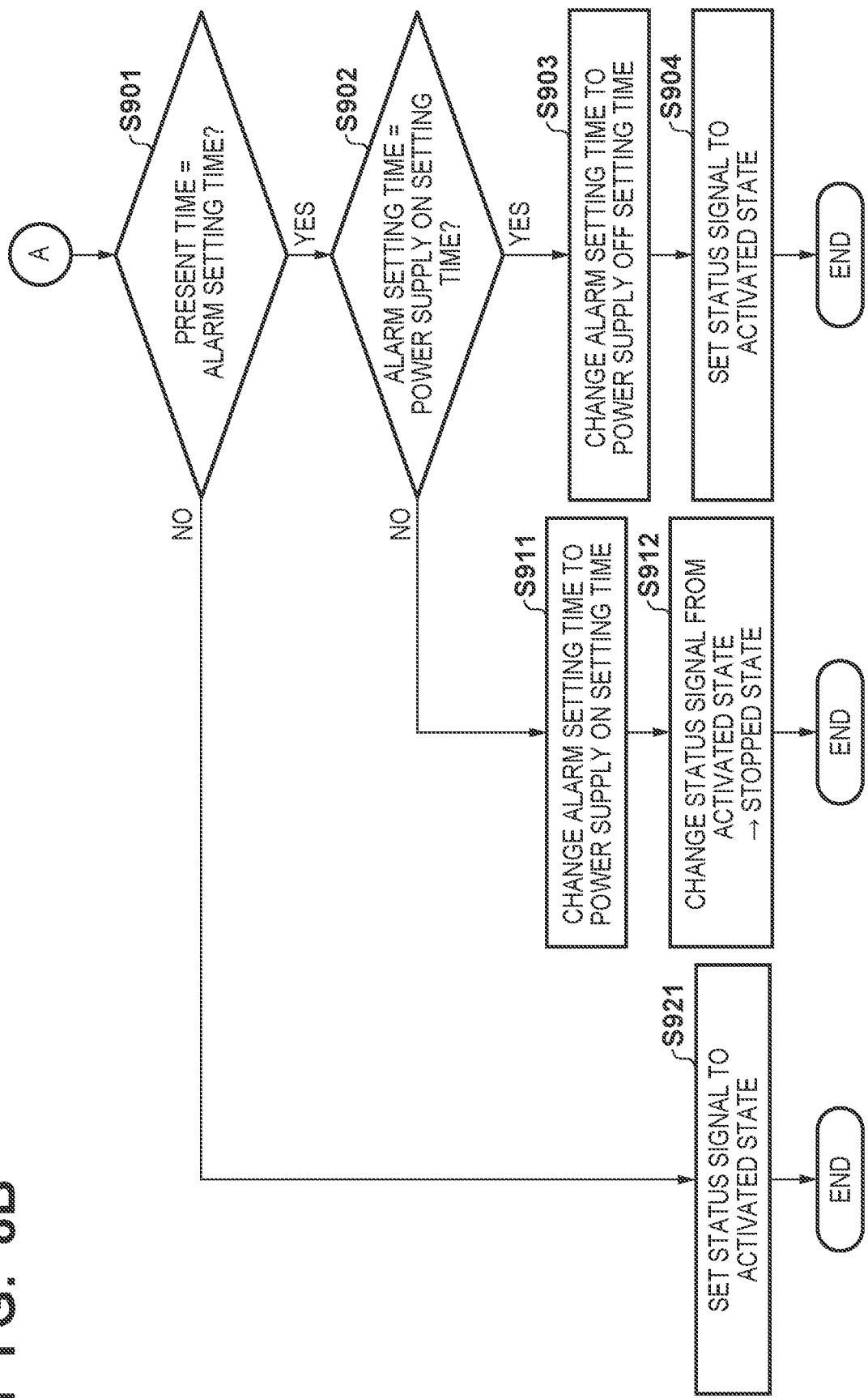
FIG. 8B is a flowchart in which the RTC setting content is changed based on the timing (continuation).

In the present embodiment, a control flowchart of FIG. 8A and FIG. 8B is executed by the ASIC 204, in particular, the CPU 401. FIG. 8B illustrates a flowchart of the branch destination of the symbol A in the flowchart of FIG. 8A.

The power status of the recording apparatus 100 is controlled accordingly using the alarm function of the RTC 208. The ASIC 204 performs the procedures of FIG. 8A and FIG. 8B when the supply of power to the ASIC 204 is started and when the ASIC 204 detects the power saving event signal 511. Since the ASIC 204 cannot receive the power saving event signal 511 unless power is supplied to the ASIC 204, when detection of the power saving event signal 511 is made to be a trigger, the soft on state is switched to the soft off state. In such cases, the ASIC 204 completes the stoppage process and then starts FIG. 8A, FIG. 8B. Similarly, when power being supplied to the ASIC 204 is made to be a trigger, the soft off state is switched to the soft on state. Note that it is assumed that both the power supply on setting time storage unit 210 and the power supply off setting time storage unit 211 are separately set before this procedure. When the AC power supply is connected and activated for the first time, the power supply off time is set as the alarm time information holding unit 602 of the RTC 208.

Once FIG. 8A is executed, the status signal 410 is confirmed (step S900). If the value thereof indicates the stopped state, it branches to step S901 of FIG. 8B. When the status signal 410 indicates the stopped state, it corresponds to a state in which the supply of power to the ASIC 204 has just been started and the apparatus is activated. In that case, it is determined whether the present time is the same as the alarm setting time (step S901). Here, the alarm setting time may be either the power supply on setting time storage unit 210 or the power supply off setting time storage unit 211. If either one of them is the same as the present time, the processing of FIG. 8A is executed using the RTC interrupt signal as a trigger, and if not the same, it can be determined that the processing of FIG. 8A is executed due to the power key being pressed.

The present time may be the present time information acquired from the RTC 208. However, since the present time continues to elapse, there is a possibility that the present time will not match with the alarm setting time in step S901. Therefore, the progress of the present time according to processing delay by the ASIC 204 or the like may be predicted in advance, and an estimated time may be obtained by subtracting the predicted value from the present time, and in the determination of step S901, the estimated time and the alarm setting time may be compared. Further, it is possible to not perform the comparison strictly, and instead determine a match when the difference between the estimated time and the alarm setting time is smaller than a predetermined value.

If it is determined in step S901 that the times do not match with each other, it is determined that the processing trigger is the power key signal 521, and the status signal 410 is set to the "activated state" (step S921). In this case, the alarm time setting is not changed and the current setting is maintained.

On the other hand, if it is determined in step S901 that the times match, it is determined that the process trigger is the RTC interrupt signal 522, and it is determined whether or not the alarm setting time matching the present time is the power supply on setting time (step S902). When the alarm setting time matching the present time is the power supply on setting time, the alarm time information holding unit 602 of the RTC 208 is rewritten to the value of the power supply off setting time storage unit 211 (step S903). Finally, the status signal 410 is set to the "activated state" (step S904). In this way, the power off time is set as the alarm time information of the RTC.

When it is determined in step S902 that the alarm setting time matching the present time is not the power supply on setting time, the alarm time information holding unit 602 of the RTC 208 is rewritten to the value of the power supply on setting time storage unit 210 (step S911). The status signal 410 is first set to "activated state" and thereafter set to "stopped state" (step S912). In this way, the power on time is set as the alarm time information of the RTC. Note that the branch from step S902 to step S911 may be performed, for example, when the power saving event signal 511 is received by the ASIC 204 when the power supply off setting time is reached after the status signal is set to the stopped state upon the power key being pressed.

In step S900, if the status signal 410 indicates the activated state, the processing branches to step S951. When the status signal 410 indicates the activated state, it corresponds to a state in which power is being supplied to the ASIC 204. In that case, it is determined whether the present time is the same as the alarm setting time (step S951). Here, the alarm setting time may be either the power supply on setting time storage unit 210 or the power supply off setting time 211. If either one of them is the same as the present time, the processing of FIG. 8A is executed using the RTC interrupt signal as a trigger, and if not the same, it can be determined that the processing of FIG. 8A is executed due to the power key being pressed. The comparison of step S951 may be similar to in step S901.

If it is determined in step S951 that the times do not match with each other, it is determined that the processing trigger is the power key signal 521, and the status signal 410 is set to the "stopped state" (step S971). In this case, the alarm time setting is not changed and the current setting is maintained.

On the other hand, if it is determined in step S951 that the times match, it is determined that the process trigger is the RTC interrupt signal 522, and it is determined whether or not the alarm setting time matching the present time is the power supply off setting time (step S952). When the alarm setting time matching the present time is the power supply off setting time, the alarm time information holding unit 602 of the RTC 208 is rewritten to the value of the power supply on setting time storage unit 210 (step S953). Finally, the status signal 410 is set to the "stopped state" (step S954). In this way, the power on time is set as the alarm time information of the RTC.

When it is determined in step S952 that the alarm setting time matching the present time is not the power supply off setting time, the alarm time information holding unit 602 of the RTC 208 is rewritten to the value of the power supply off setting time storage unit 211 (step S961). The status signal 410 may remain in the "activated state" and not be changed (step S962). In this way, the power off time is set as the alarm time information of the RTC. Note that the branch from step S952 to step S961 may be performed, for example, when the power saving event signal 511 is received by the ASIC 204 when the power supply on setting time is reached after the status signal is set to the activated state upon the power key being pressed.

In the above procedure, the power supply on time and the power supply off time are set in the RTC 208, and the scheduled turning on/off of the power supply can be executed based on the interrupt signal from the RTC 208. When the power supply is turned off, the supply of power to the ASIC 204, which is the control unit of the inkjet recording apparatus, can also be stopped.

Timing Diagram Example

Next, referring to FIG. 7, a specific example will be described in accordance with FIG. 8A and FIG. 8B.

Figure 7:
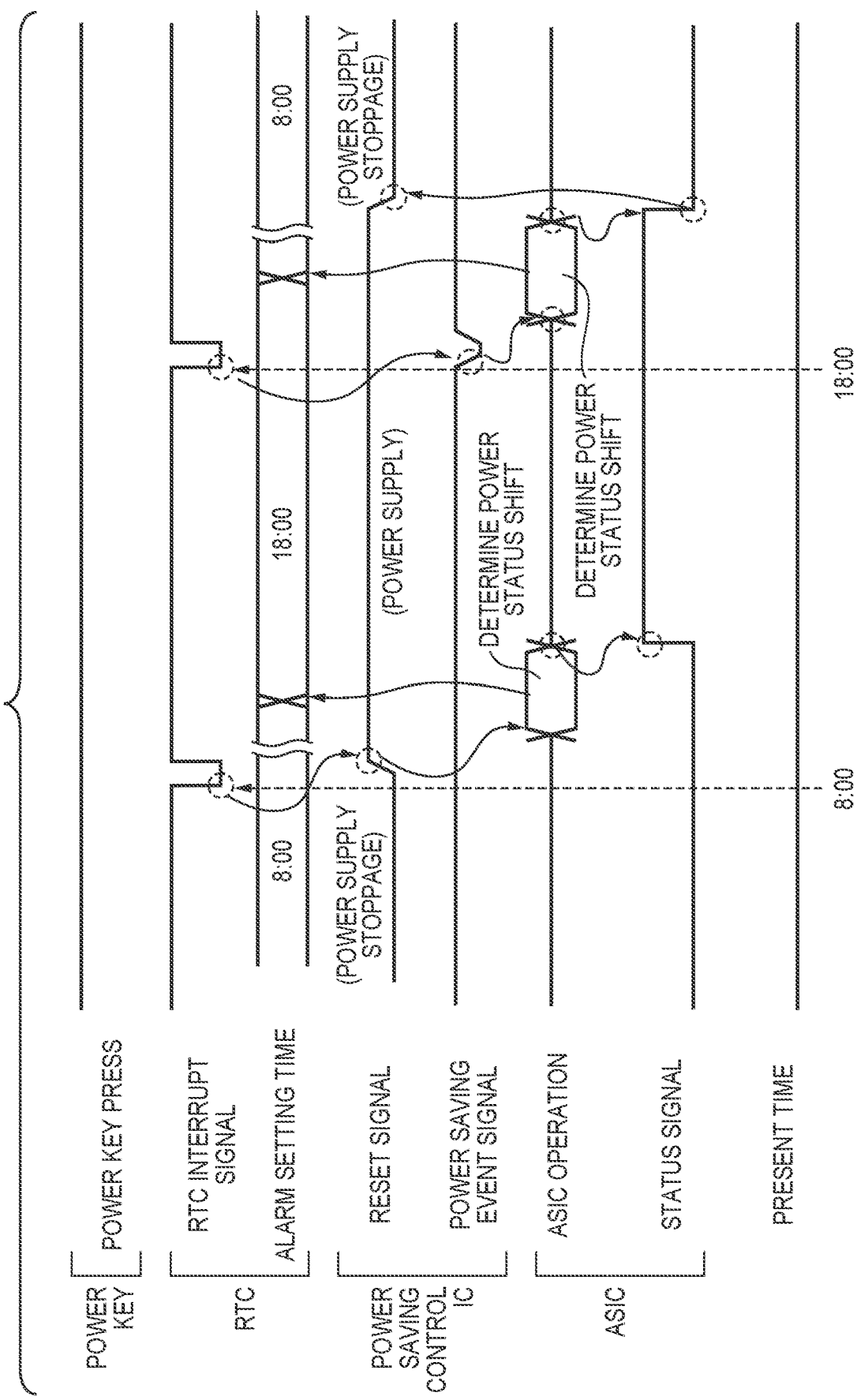
FIG. 7 is a view illustrating a control sequence example 1 in which RTC setting content is changed based on the timing.

Control Sequence Example 1 for Changing Setting Content Based on Time (FIG. 7)

FIG. 7 is a time chart illustrating operation of the power key, the RTC, and the ASIC in the user operation pattern 1. The pattern 1 is one in which a user does not perform a power off operation and a power on operation.

In FIG. 7, at time 8:00, the reset signal is released by the interrupt signal of the RTC, and the supply of power is started. When supply of power to the ASIC is started (status signal=Low (stopped state)), the present time and the RTC alarm setting time are checked in step S901. If the present time is the alarm setting time, it can be determined that the supply of power is started by the RTC interrupt signal; otherwise, it can be determined to be due to the power key being pressed by a user.

In step S902, the alarm setting time of the RTC is compared with the schedule setting time of the main unit, and if it is the power supply on setting time, the alarm setting time is changed to the power supply off setting time in step S903. Then, the status signal (activated state) is set to high in step S904.

At time 18:00, the power saving event signal is outputted by the RTC interrupt signal. When the ASIC receives the power saving event signal, the ASIC checks the status signal in step S900, and if the status signal is the activated state, the ASIC advances to step S951.

In step S951, the present time and the RTC alarm setting time are checked. If the present time is the alarm setting time, it can be determined that the power saving event signal is due to the RTC interrupt signal; otherwise, it can be determined to be due to the power key being pressed by a user.

In step S952, the alarm setting time of the RTC is compared with the schedule setting time of the main unit, and if the alarm setting time is the power supply off setting time, the alarm setting time is changed to the power supply on setting time in step S953. Then, in step S954, the status signal is set to low (the supply of power from the power supply controller is stopped).

Control Sequence Example 2 for Changing Setting Content of the RTC Based on the Time (FIG. 9A)

Next, examples of an unintended supply of power and a missed power key press in the processes of FIG. 8A and FIG.

8B will be described with reference to user operation patterns 2 and 2B in FIG. 6. With the pattern 2, a power off operation is performed at 17:00, and with the pattern 2B, a power off operation is performed at 17:00 and a power on operation at 18:00.

FIG. 9A is an example of a time chart illustrating operation of the power key, the RTC, and the ASIC in the user operation patterns 2 and 2B. Here, only in the pattern 2B is the power key pressed at time 18:00 (the part enclosed by a circular dotted line). The operation at time 8:00 is similar to that of FIG. 7, and the description thereof is omitted.

At time 17:00, the power saving event signal 511 is outputted upon a pressing of the power key. When the ASIC 204 receives the power saving event signal 511, the ASIC 204 checks the status signal in step S900, and if the status signal is the activated state, the ASIC 204 advances to step S951. Since the present time is not the alarm setting time in step S951, the ASIC 204 advances to step S971. Then, in step S971, the ASIC 204 sets the status signal to the stopped state. As a result, the supply of the system power from the power supply control unit 202 is stopped. In the case where the user operation pattern 2 is followed, at time 18:00, the reset signal is released upon the interrupt signal of the RTC 208, and the supply of power is started.

When the power is supplied to the ASIC, it is determined that the status signal is the stopped state in step S900, the present time and the RTC alarm setting time are checked in step S901, and the processing proceeds to step S902. Since the alarm setting time of the RTC is not the power supply on setting time of the main unit in step S902, the process proceeds to step S911. In step S911, the alarm setting time is changed to the power supply on setting time. Then, in step S912, after the status signal is set to the activated state, the stopped state is immediately set. As a result, the supply of the system power from the power supply control unit 202 is stopped.

When the user presses the power key at time 18:00 as in the case of the user operation pattern 2B, the power key is pressed and an RTC interrupt signal is outputted simultaneously. At this time, the ASIC 204 cannot distinguish which signal the power saving event signal 511 is based on. In that case, for example, it is determined in step S901 that the present time matches with the alarm setting time, and the scheduled operation is prioritized. After that, the processing flows to step S912, and the supply of power is stopped. Since the user wants to supply power at time 18:00, the operation is such that a high priority power key press is missed.

Figure 9B:
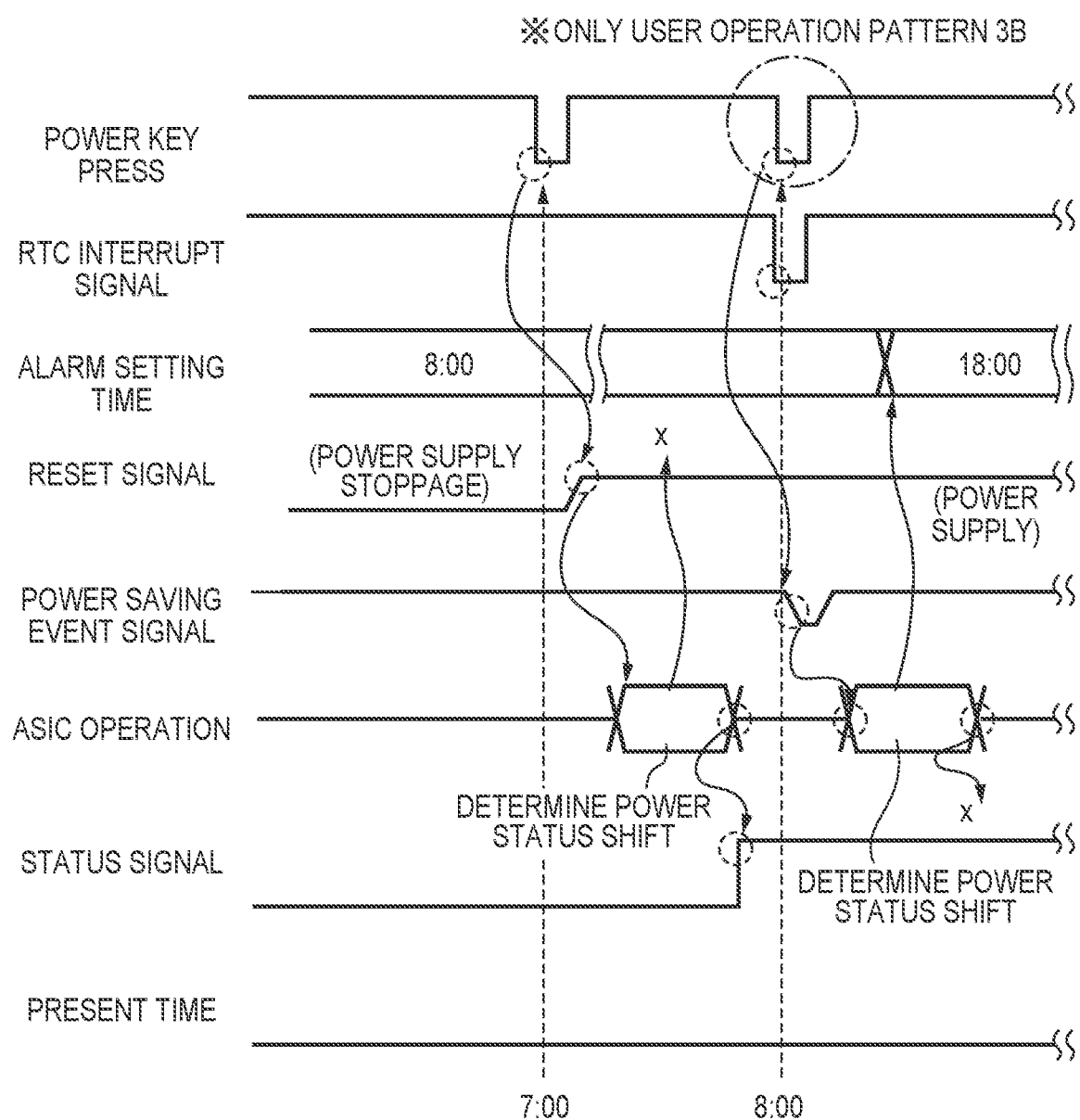
FIG. 9B is a view illustrating a control sequence example 3 in which RTC setting content is changed based on the timing.

Control Sequence Example 3 for Changing Setting Content of the RTC Based on the Time (FIG. 9B)

Next, examples of an unintended supply of power and a missed power key press will be described with reference to user operation patterns 3 and 3B in FIG. 6. With pattern 3, the power is turned on at 7:00, and with pattern 3B, the power is turned off at 8:00 in addition to that. FIG. 9B is an example of a time chart illustrating operation of the power key, the RTC, and the ASIC in the user operation patterns 3 and 3B. Here, only in the pattern 3B is the power key pressed at time 8:00 (the part enclosed by a circular dotted line).

At time 7:00, the reset signal is released upon the pressing of the power key, and the supply of power is started. When the supply of power to the ASIC is started (status signal=stopped state), it is determined in step S901 that the present time is not the RTC alarm setting time, and it is determined to be due to the user's power key press, and the process proceeds to step S921. Then, in step S921, the ASIC 204 sets the status signal to the activated state. When the user operation pattern 3 is followed, only the RTC interrupt signal 522 is generated at time 8:00.

When the ASIC 204 receives the power saving event signal 511, the ASIC 204 checks the status signal in step S900, and if the status signal is determined to be the activated state, the ASIC 204 advances to step S951.

Since the present time is the RTC alarm setting time in step S951, it is determined that the power saving event signal is due to the RTC interrupt signal 522, and the process advances to step S952. Since the alarm setting time of the RTC is not the power supply off setting time of the main unit in step S952, the process proceeds to step S961. In step S961, the alarm setting time is changed to the power supply off setting time. Then, in step S962, the ASIC 204 leaves the status signal as the activated state. That is, the system power supply 305 from the power supply control unit 202 continues to be supplied.

When the user presses the power key at time 8:00 as in the case of the user operation pattern 3B, the power key is pressed and an RTC interrupt signal is outputted simultaneously. At this time, the ASIC 204 cannot distinguish which signal the power saving event signal 511 is based on. In that case, for example, it is determined in step S951 that the present time matches with the alarm setting time, and the scheduled operation is prioritized. After that, the processing flows to step S962, and the supply of power is left on. Since the user wants to stop the supply of power at time 18:00, the operation is such that a high priority power key press is missed.

According to the sequence of FIG. 8A and FIG. 8B, by using the RTC alarm setting, a scheduled power on/off becomes possible, even if the supply of power to the ASIC 204 is stopped. However, as described in FIG. 9A and FIG. 9B, when the scheduled power on/off and the power on/off by the user's operation of the power key are simultaneously performed, the scheduled power on operation is prioritized. That is, a user operation which should be prioritized in order to improve availability may be ignored.

In the second embodiment described below, this is remedied by not only enabling a scheduled power on/off but also prioritize a user operation even if the supply of power to the ASIC 204 is stopped.

Second Embodiment

The inkjet recording apparatus of the present embodiment has a similar configuration to that of the first embodiment, but the schedule setting sequence is changed from FIG. 8A and FIG. 8B to FIG. 10.

<Control Procedure for Changing the RTC Setting Content Considering Power Key (FIG. 10)>

Figure 10:
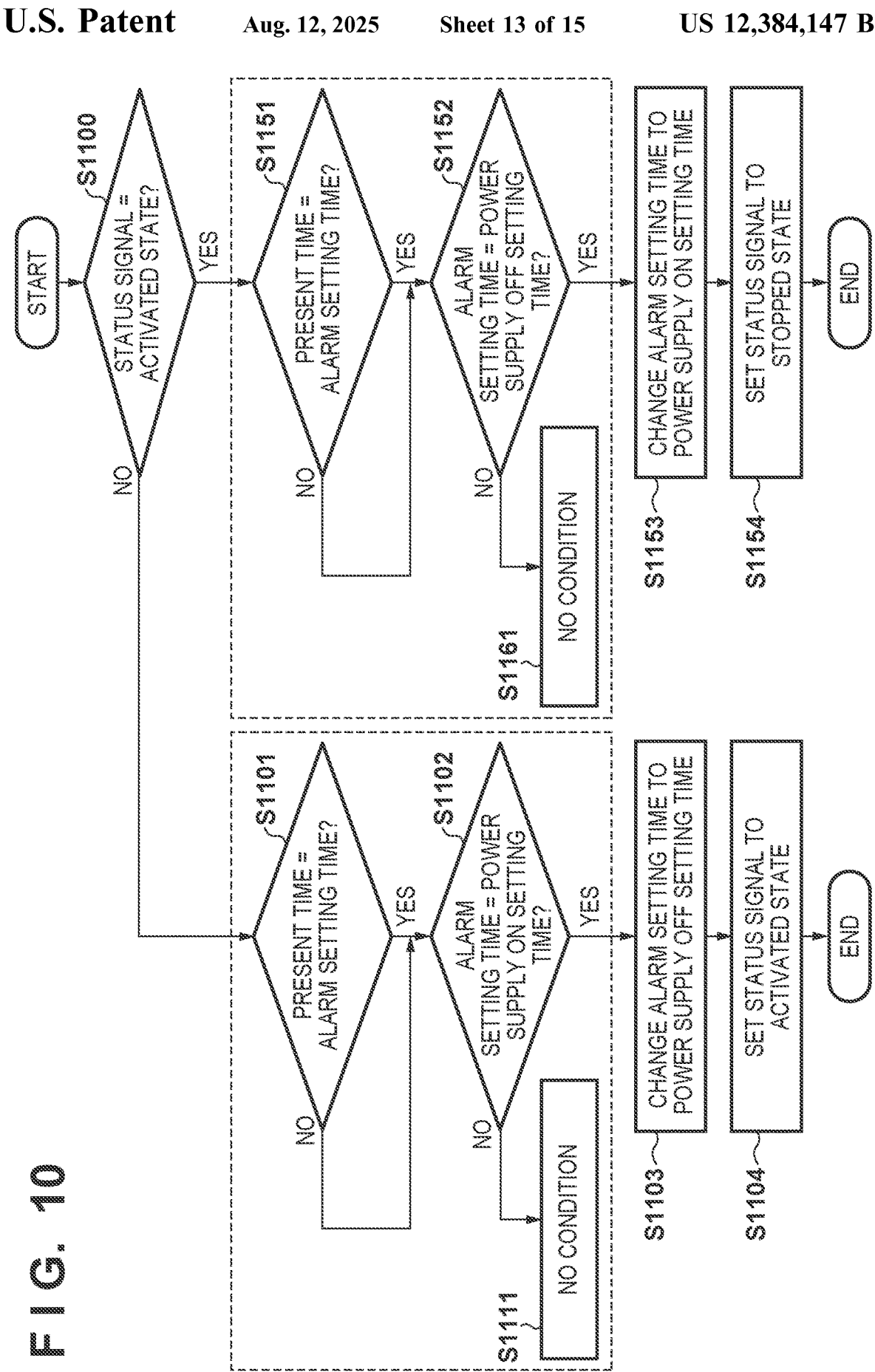
FIG. 10 is a flowchart in which the RTC setting content is changed taking into consideration a power key.

In the present embodiment, a control flowchart of FIG. 10 is executed by the ASIC 204, in particular, the CPU 401. The power status of the recording apparatus 100 is controlled accordingly using the alarm function of the RTC 208.

The ASIC 204 performs the procedure of FIG. 10 when the supply of power to the ASIC 204 is started and when the ASIC 204 detects the power saving event signal 511. Since the ASIC 204 cannot receive the power saving event signal 511 unless power is supplied to the ASIC 204, when detection of the power saving event signal 511 is made to be a trigger, the soft on state is switched to the soft off state. In such cases, the ASIC 204 completes the stoppage process and then starts FIG. 10. Similarly, when power being supplied to the ASIC 204 is made to be a trigger, the soft off state is switched to the soft on state. Note that it is assumed that both the power supply on setting time storage unit 210 and the power supply off setting time storage unit 211 are separately set before this procedure. When the AC power supply is connected and activated for the first time, the power supply off time is set to the alarm time information holding unit 602 of the RTC 208.

Once FIG. 10 is executed, the status signal 410 is confirmed (step S1100). If the value thereof indicates the stopped state, the processing branches to step S1103. When the status signal 410 indicates the stopped state, it corresponds to a state in which the supply of power to the ASIC 204 has just been started and the apparatus activated. In the case of the power supply on setting time in that case, the alarm time information holding unit 602 of the RTC 208 is rewritten to the value of the power supply off setting time storage unit 211 (step S1103). Finally, the status signal 410 is set to the "activated state" (step S1104). In this way, the power off time is set as the alarm time information of the RTC.

Note that step S1101, step S1102, and step S1111 which are enclosed by a dotted line in FIG. 10 are steps that do not actually need to be executed, but are illustrated for comparison with step S902, step S903, and step S911 in FIG. 8B. In step S1101, it is determined whether the present time is the same as the alarm setting time (step S1101). However, in step S1101, both branch destinations are step S1102, and so the step may be skipped. In addition, in step S1102, it is determined whether the alarm setting time matching with the present time is the power supply on setting time. However, in the procedure of FIG. 10, the status signal 410 is in the stopped state, and the alarm setting time is not the power on time. This is because the combination of the alarm setting time and the status signal is either that the power supply off setting time is set in step S1103 and the activated state is set in step S1104, or the power supply on setting time is set in step S1153 to be described later and the stopped state is set in step S1154. Therefore, step S1102 does not need to be executed.

In step S1100, if the status signal 410 indicates the activated state, the processing branches to in step S1153. Accordingly, the alarm time information holding unit 602 of the RTC 208 is rewritten to the value of the power supply on setting time storage unit 210 (step S1153). Finally, the status signal 410 is set to the "stopped state" (step S1154). In this way, the power on time is set as the alarm time information of the RTC.

Note that step S1151, step S1152, and step S1161 which are enclosed by a dotted line in FIG. 10 are steps that do not actually need to be executed, but are illustrated for comparison with step S952, step S953, and step S961 in FIG. 8A. In step S1151, it is determined whether the present time is the same as the alarm setting time (step S1151). However, in step S1151, both branch destinations are step S1152, and so the step may be skipped. Step S1152 may also be skipped for the same reason as step S1102. Therefore, step S1152 does not need to be executed.

In the above procedure, based on the value of the status signal, the power supply on time and the power supply off time are set in the RTC 208, and the scheduled turning on/off of the power supply can be executed based on the interrupt signal from the RTC 208. When the power supply is turned off, the supply of power to the ASIC 204, which is the control unit of the inkjet recording apparatus, can also be stopped. Further, in the process of FIG. 10, the ASIC 204, after receiving the power saving event signal 511, schedules the power off and then turns the power on, regardless of the reason for the reception, if in the stopped state. Conversely, the ASIC 204, after receiving the power saving event signal 511, schedules the power on and then turns the power off, regardless of the reason for the reception, if in the activated state. By doing so, it is possible to turn on/off the electric power respecting an operation of the user, and thus it is possible to improve the operability.

Timing Diagram Example

Next, a specific example will be described with reference to FIG. 10 referring to FIG. 11A and FIG. 11B.

In the control configuration of the present embodiment, when the control flow of FIG. 10 is used, an unintended supply of power and missing a power key press which occur in the first embodiment are solved.

Control Sequence Example 1 for Changing the RTC Setting Content Considering Power Key (FIG. 11A)

Next, in FIG. 11A, a specific example of the present embodiment is described using the example of the user operation patterns 2 and 2B of FIG. 6, and an example that eliminates an unintended supply of power and missing of a power key press that occur in the first embodiment is illustrated. FIG. 11A is an example time chart illustrating operation of the power key, the RTC, and the ASIC in the user operation patterns 2 and 2B.

The operation of time 8:00 in FIG. 11A is similar to FIG. 7 and omitted. At time 17:00, the power saving event signal is outputted upon the pressing of the power key. When the ASIC 204 receives the power saving event signal, the ASIC 204 checks the status signal in step S1100, and if the status signal is the activated state, the ASIC 204 advances to step S1153. In step S1153, the alarm setting time is changed to the power supply on setting time. Then, the status signal (stopped state) is set to low in step S1154. As a result, the supply of the system power from the power supply control unit 202 is stopped.

Also, when the user presses the power key at time 18:00 as in the case of the user operation pattern 2B, since the alarm setting time has already been changed to 8:00 at time 17:00, the RTC interrupt is not outputted. For this reason, operation in which the power key press is missed as described in FIG. 9A is eliminated, and the supply of power can be started normally.

Figure 11B:
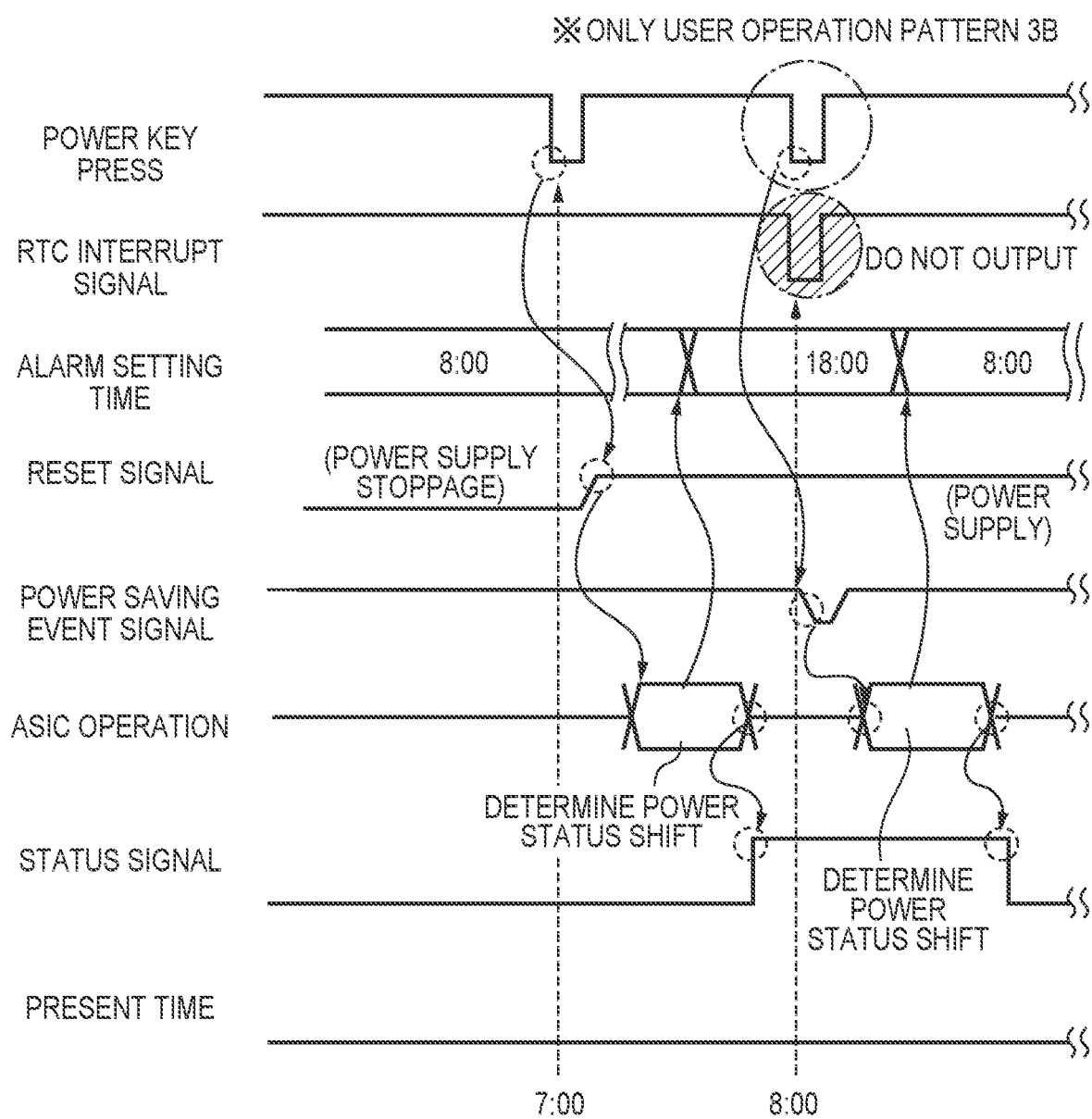
FIG. 11B is a view illustrating the control sequence example 2 in which RTC setting content is changed taking into consideration the power key.

Control Sequence Example 2 for Changing the RTC Setting Content Considering Power Key (FIG. 11B)

Next, the examples of the user operation patterns 3 and 3B of FIG. 6 are described in FIG. 11B, and an example in which a power key press is missed which occurs in the first embodiment is eliminated is given. FIG. 11B is an example of a time chart illustrating operation of the power key, the RTC, and the ASIC in the user operation patterns 3 and 3B. Here, only in the pattern 3B is the power key pressed at time 8:00 (the part enclosed by a circular dotted line).

At time 7:00, the reset signal is released upon the pressing of the power key, and the supply of power is started. When the supply of power to the ASIC is started, it is determined that the status signal is the stopped state (step S1100) in the process of FIG. 11, and the process branches to step S1103. In step S1103, the alarm setting time is changed to the power supply off setting time. Then, the status signal (activated state) is set to high in step S1104.

Also, when the user presses the power key at time 18:00 as in the case of the user operation pattern 3B, since the alarm setting time has already been changed to 8:00 at time 17:00, the RTC interrupt is not outputted. Therefore, the interrupt of the RTC is not outputted, and the supply of power can be normally stopped without missing the pressing of the power key as described in the first embodiment.

As described above, when the supply of power is started and when a power saving event signal is generated, the scheduling is reset regardless of whether the cause is a power key or an interrupt from the RTC. By doing so, it is possible to turn on/off the electric power respecting an operation of the user, and thus it is possible to improve the operability. Further, even if the supply of power to the ASIC which is the control unit is stopped, scheduled power on/off can be realized, and thus power consumption can be further reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-151801, filed Sep. 22, 2022, Japanese Patent Application No. 2022-195016 filed Dec. 6, 2022 which are hereby incorporated by reference herein in their entirety.

What is claimed is:

1. A power supply control apparatus, comprising:
a first power supply unit operable to switch a supply of electric power on and off;
a second power supply unit configured to perform a continuous supply of electric power;
a controller configured to operate by electric power supplied from the first power supply unit;
a timer configured to operate by electric power supplied from the second power supply unit or a dedicated power supply, and to output a signal when a set time is reached; and
an operation unit configured to operate by electric power supplied from the second power supply unit, and for an operation by which a user switches the supply of electric power from the first power supply unit on and off; and
a power controller configured to operate by electric power supplied from the second power supply unit, and operable to turn on the supply of electric power from the first power supply unit in accordance with the signal from the timer or the operation by the operation unit, and to turn off the supply of electric power from the first power supply unit in accordance with a state of the controller,
wherein the controller, upon at least either of the operation by the operation unit or the signal from the timer, performs a setting to the timer of a time at which to turn on the supply of electric power from the first power supply unit or a time at which to turn off the supply of electric power from the first power supply unit and performs a setting of the state of the controller, in accordance with the state of the controller.

2. The power supply control apparatus according to claim 1, wherein the power controller turns off the supply of electric power from the first power supply unit when the state of the controller changes from an activated state to a stopped state, and
wherein the controller, upon at least either of the operation by the operation unit and the signal from the timer, sets to the timer the time at which to turn on the supply of electric power from the first power supply unit and sets the stopped state as the state if the controller is in the activated state, and sets to the timer the time at which to turn off the supply of electric power from the first power supply unit and sets the activated state as the state if the controller is in the stopped state.

3. The power supply control apparatus according to claim 1, wherein the controller includes a non-volatile storage unit, and at least either the time at which to turn on the supply of electric power from the first power supply unit and the time at which to turn off the supply of electric power from the first power supply unit is stored in the non-volatile storage unit, and
wherein the controller sets a time acquired from the non-volatile storage unit to the timer.

4. The power supply control apparatus according to claim 1, wherein the power controller turns off the supply of electric power from the first power supply unit when the state of the controller changes from an activated state to a stopped state, and
wherein the controller, upon at least either the operation by the operation unit or the signal from the timer, (i) in a case where the controller is in an activated state, (i-i) upon the operation by the operation unit, sets the stopped state as the state, (i-ii) upon the signal from the timer due to the time at which to turn on electric power supplied from the first power supply unit being reached, sets to the timer the time at which to turn off electric power supplied from the first power supply unit, and (i-iii) upon the signal from the timer due to the time at which to turn off electric power supplied from the first power supply unit being reached, sets to the timer the time at which to turn on electric power supplied from the first power supply unit, and (ii) in a case where the controller is in a stopped state, (ii-i) upon the operation by the operation unit, sets the activated state as the state, (ii-ii) upon the signal from the timer due to the time at which to turn off electric power supplied from the first power supply unit being reached, sets to the timer the time at which to turn on electric power supplied from the first power supply unit, and sets the activated state as the state, and (ii-iii) upon the signal from the timer due to the time at which to turn on electric power supplied from the first power supply unit being reached, sets to the timer the time at which to turn off electric power supplied from the first power supply unit.

5. A recording apparatus, comprising:

a power supply control apparatus, and a recording unit for recording an image on a medium, wherein the power supply control apparatus comprises:

a first power supply unit operable to switch a supply of electric power on and off;

a second power supply unit configured to perform a continuous supply of electric power;

a controller configured to operate by electric power supplied from the first power supply unit;

a timer configured to operate by electric power supplied from the second power supply unit or a dedicated power supply, and to output a signal when a set time is reached; and an operation unit configured to operate by electric power supplied from the second power supply unit, and for an operation by which a user switches the supply of electric power from the first power supply unit on and off; and a power controller configured to operate by electric power supplied from the second power supply unit, and operable to turn on the supply of electric power from the first power supply unit in accordance with the signal from the timer or the operation by the operation unit, and to turn off the supply of electric power from the first power supply unit in accordance with a state of the controller, and wherein the controller, upon at least either of the operation by the operation unit or the signal from the timer, performs a setting to the timer of a time at which to turn on the supply of electric power from the first power supply unit or a time at which to turn off the supply of electric power from the first power supply unit and performs a setting of the state of the controller, in accordance with the state of the controller.

6. A power supply control method performed by a power supply control apparatus comprising:

a first power supply unit operable to switch a supply of electric power on and off; a second power supply unit configured to perform a continuous supply of electric power;

a controller configured to operate by electric power supplied from the first power supply unit;

a timer configured to operate by electric power supplied from the second power supply unit or a dedicated power supply, and to output a signal when a set time is reached;

an operation unit configured to operate by electric power supplied from the second power supply unit, and for an operation by which a user switches the supply of electric power from the first power supply unit on and off; and a power controller configured to operate by electric power supplied from the second power supply unit, and operable to turn on the supply of electric power from the first power supply unit in accordance with the signal from the timer or the operation by the operation unit, and to turn off the supply of electric power from the first power supply unit in accordance with a state of the controller, wherein the controller, upon at least either of the operation by the operation unit or the signal from the timer, performs a setting to the timer of a time at which to turn on the supply of electric power from the first power supply unit or a time at which to turn off the supply of electric power from the first power supply unit and performs a setting of the state of the controller, in accordance with the state of the controller.

* * * * *